United States Patent
Rahman et al.

(10) Patent No.: US 10,396,866 B2
(45) Date of Patent: Aug. 27, 2019

(54) ADVANCED CSI REPORTING IN ADVANCED WIRELESS COMMUNICATION SYSTEMS

(71) Applicant: Samsung Electronics Co., Ltd., Suwon-si, Gyeonggi-do (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/718,631

(22) Filed: Sep. 28, 2017

(65) Prior Publication Data

US 2018/0138950 A1    May 17, 2018

Related U.S. Application Data

(60) Provisional application No. 62/420,996, filed on Nov. 11, 2016, provisional application No. 62/426,073, (Continued)

(51) Int. Cl.
*H04B 7/06* (2006.01)
*H04L 5/00* (2006.01)
(Continued)

(52) U.S. Cl.
CPC ........... *H04B 7/0417* (2013.01); *H04B 7/063* (2013.01); *H04B 7/0626* (2013.01);
(Continued)

(58) Field of Classification Search
CPC ....... H04B 7/04; H04B 7/0421; H04B 7/0456
See application file for complete search history.

(56) References Cited

U.S. PATENT DOCUMENTS

| 2011/0249643 A1* | 10/2011 | Barbieri | ............... H04L 1/0026 370/329 |
| 2012/0177092 A1* | 7/2012 | Zirwas | ............... H04W 28/06 375/219 |

(Continued)

OTHER PUBLICATIONS

"Downlink," 3GPP TS 36.211, V14.3.0, Release 14, Jun. 2017, pp. 76-154.

(Continued)

*Primary Examiner* — Melanie Jagannathan

(57) ABSTRACT

A method of a user equipment (UE) for a channel state information (CSI) feedback in an advanced communication system. The method comprises receiving, from a base station (BS), CSI configuration information to report a wideband periodic CSI including a pre-coding matrix indicator (PMI), a rank indicator (RI) and a relative power indicator (RPI) based on a linear combination (LC) codebook, wherein the PMI comprises a first PMI ($i_1$) indicating a plurality of beams and a second PMI ($i_2$) indicating a plurality of weights for linear combination of the plurality of beams; determining, based on the CSI configuration information, the RI and the RPI indicating a power of weights assigned to the plurality of beams; and transmitting, to the BS over an uplink channel, a first CSI feedback comprising the RI and RPI in a first periodic reporting instance out of a plurality of periodic reporting instances.

20 Claims, 13 Drawing Sheets

Related U.S. Application Data filed on Nov. 23, 2016, provisional application No. 62/456,391, filed on Feb. 8, 2017, provisional application No. 62/458,826, filed on Feb. 14, 2017, provisional application No. 62/463,837, filed on Feb. 27, 2017.

(51) Int. Cl.
  *H04W 84/04* (2009.01)
  *H04B 7/0417* (2017.01)
  *H04B 7/0456* (2017.01)
(52) U.S. Cl.
  CPC ............ *H04B 7/0639* (2013.01); *H04L 5/00* (2013.01); *H04B 7/0456* (2013.01); *H04W 84/042* (2013.01)

(56) References Cited

U.S. PATENT DOCUMENTS

| | | | |
|---|---|---|---|
| 2012/0287875 A1* | 11/2012 | Kim .................. | H04B 7/024 370/329 |
| 2015/0030092 A1* | 1/2015 | Krishnamurthy .... | H04B 7/0456 375/267 |
| 2016/0142117 A1 | 5/2016 | Rahman et al. | |

OTHER PUBLICATIONS

"3rd Generation Partnership Project; Technical Specification Group Radio Access Network; Evolved Universal Terrestrial Radio Access (E-UTRA); Physical Channels and Modulation (Release 14)," 3GPP TS 36.211, V14.3.0, Jun. 2017, 7 pages.
"Sidelink" 3GPP TS 36.211, V14.3.0, Release 14, Jun. 2017, pp. 155-195.
"Foreword," 3GPP TS 36.211, V14.3.0, Release 14, Jun. 2017, pp. 8-75.
"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.3.0, Jun. 2017, 198 pages.
"3rd Generation Partnership Project; Technical Specification Group Radio Access Network; Evolved Universal Terrestrial Radio Access (E-UTRA); Physical Layer Procedures (Release 14)," 3GPP TS 36.213, V14.3.0, Jun. 2017, 7 pages.
"Foreword," 3GPP TS 36.213, V14.3.0, Release 14, Jun. 2017, pp. 8-49.
"Random Access Procedure," 3GPP TS 36.213, V14.3.0, Release 14, Jun. 2017, pp. 50-305.
"Physical Uplink Control Channel Procedures," 3GPP TS 36.213, V14.3.0, Release 14, Jun. 2017, pp. 306-390.
"UE Procedures Related to Sidelink," 3GPP TS 36.213, V14.3.0, Release 14, Jun. 2017, pp. 391-447.
"Annex A (Informative): Change History," 3GPP TS 36.213, V14.3.0, Release 14, Jun. 2017, pp. 448-460.
"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321, V14.3.0, Jun. 2017, 107 pages.
"3rd Generation Partnership Project; Technical Specification Group Radio Access Network; Evolved Universal Terrestrial Radio Access (E-UTRA); Radio Resource Control (RRC) Protocol Specification (Release 14)," 3GPP TS 36.331, V14.3.0, Jun. 2017, 745 pages.
"New WID Proposal: Enhancements on Full-Dimension (FD) MIMO for LTE," 3GPP TSG RAN Melting #71, RP-160623, Samsung, Goteborg, Sweden, Mar. 7-10, 2016, 8 pages.
International Search Report regarding Application No. PCT/KR2017/012071, dated Feb. 22, 2018, 3 pages.
Samsung, "Linear combination codebook and CSI reporting", 3GPP TSG RAN WG1 Meeting #84bis, R1-162693, Apr. 2016, 6 pages.
Ericsson, "Support of Advanced CSI for Class B", 3GPP TSG-RAN WG1 #87, R1-1612666, Nov. 2016, 7 pages.
ZTE et al., "Feedback mechanism for linear combination based CSI", 3GPP TSG RAN WG1 Meeting #86bis, R1-1611427, Oct. 2016, 4 pages.

\* cited by examiner

| Port layouts, Number of ports | Orthogonal beams | | Number of beams ($L'$) |
|---|---|---|---|
| | $N_1 \geq N_2$ | $N_1 < N_2$ | |
| 1D, 4 ports |  | - | 2 |
| 1D, 8 ports |  | - | 4 |
| 1D, 12 ports |  | - | 6 |
| 1D, {16, 20, 24, 28, 32} ports |  | - | 8 |
| 2D, 8 ports |  | - | 4 |
| 2D, 12 ports |  |  | 6 |
| 2D, {16, 20, 24, 28, 32} ports |  |  | 8 |

ADVANCED CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/420,996, filed on Nov. 11, 2016; U.S. Provisional Patent Application Ser. No. 62/426,073, filed on Nov. 23, 2016; U.S. Provisional Patent Application Ser. No. 62/456,391, filed on Feb. 8, 2017; U.S. Provisional Patent Application Ser. No. 62/458,826, filed on Feb. 14, 2017; and U.S. Provisional Patent Application Ser. No. 62/463,837, filed on Feb. 27, 2017. The content of the above-identified patent documents are incorporated herein by reference.

TECHNICAL FIELD

The present application relates generally to channel state information (CSI) reporting operation in advanced wireless communication systems. More specifically, this disclosure relates to linear combination codebook based periodic CSI reporting.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-$5^{th}$-generation (5G) or 5G communication system to be provided for supporting higher data rates beyond $4^{th}$-generation (4G) communication system such as long term evolution (LTE). Embodiments of the present disclosure provide an advanced CSI reporting based on a linear combination codebook for MIMO wireless communication systems.

In one embodiment, a user equipment (UE) for a channel state information (CSI) feedback in an advanced communication system is provided. The UE includes a transceiver configured to receive, from a base station (BS), CSI configuration information to report a wideband periodic CSI including a pre-coding matrix indicator (PMI), a rank indicator (RI) and a relative power indicator (RPI) based on a linear combination (LC) codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams. The UE further includes at least one processor configured to determine, based on the CSI configuration information the RI and the RPI, wherein the transceiver is further configured to transmit, to the BS over an uplink channel, a first CSI feedback comprising the RI and RPI in a first periodic reporting instance out of a plurality of periodic reporting instances.

In another embodiment, a base station (BS) for a channel state information (CSI) feedback in an advanced communication system is provided. the BS includes a transceiver configured to transmit, to a user equipment (UE), CSI configuration information to receive a wideband periodic CSI including a pre-coding matrix indicator (PMI), a rank indicator (RI) and a relative power indicator (RPI) based on a linear combination (LC) codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams; and receive, from the UE over an uplink channel, a first CSI feedback comprising the RI and RPI in a first periodic reporting instance out of a plurality of periodic reporting instances.

In yet another embodiment, a method of a user equipment (UE) for a channel state information (CSI) feedback in an advanced communication system is provided. The method comprises receiving, from a base station (BS), CSI configuration information to report a wideband periodic CSI including a pre-coding matrix indicator (PMI), a rank indicator (RI) and a relative power indicator (RPI) based on a linear combination (LC) codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams, determining, based on the CSI configuration information, the RI and the RPI, and transmitting, to the BS over an uplink channel, a first CSI feedback comprising the RI and RPI in a first periodic reporting instance out of a plurality of periodic reporting instance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), disclosure can be extended to other OFDM-based transmission waveforms or multiple access schemes such as filtered OFDM (F-OFDM).

This present disclosure covers several components which can be used in conjunction or in combination with one another, or can operate as standalone schemes.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v14.3.0, "E-UTRA, Physical channels and modulation" (REF1); 3GPP TS 36.212 v14.3.0, "E-UTRA, Multiplexing and Channel coding" (REF2); 3GPP TS 36.213 v14.3.0, "E-UTRA, Physical Layer Procedures" (REF3); 3GPP TS 36.321 v14.3.0, "E-UTRA, Medium Access Control (MAC) protocol specification" (REF4); 3GPP TS 36.331 v14.3.0, "E-UTRA, Radio Resource Control (RRC) protocol specification" (REF5); and RP-160623, "New WID Proposal: Enhancements on Full-Dimension (FD) MIMO for LTE," Samsung.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
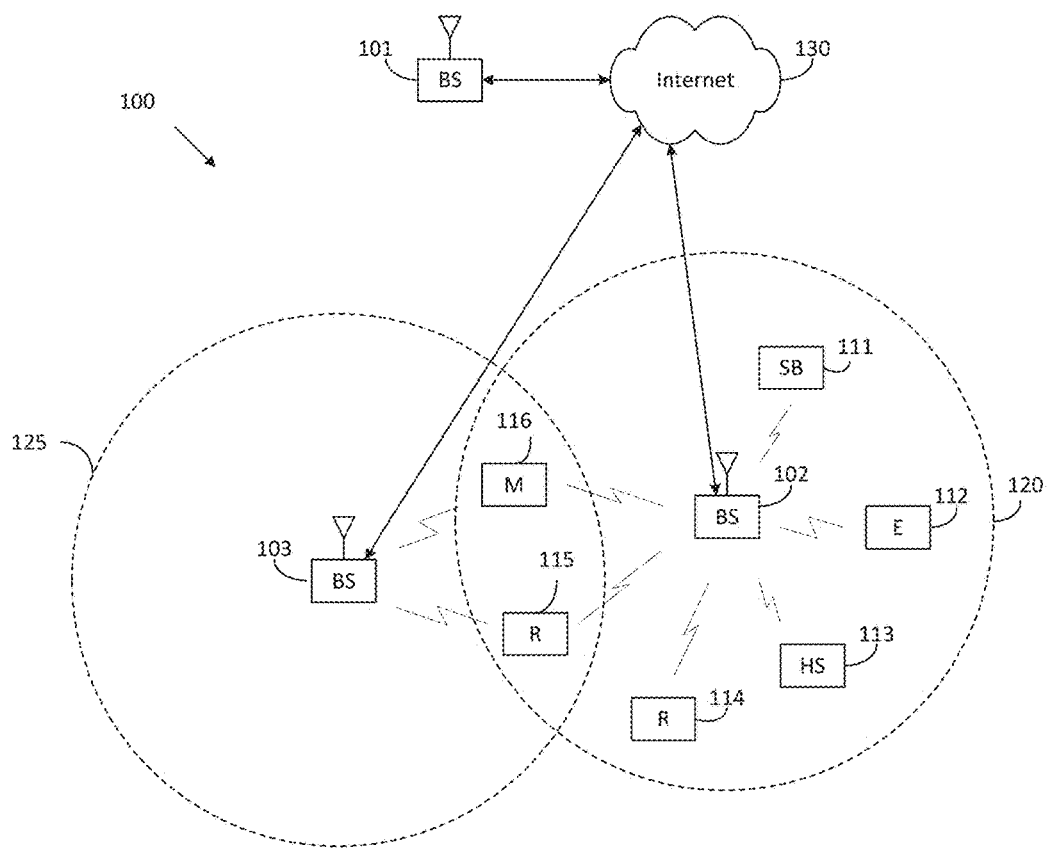
FIG. 1 illustrates an example wireless network according to embodiments of the present disclosure.
Figure 2:
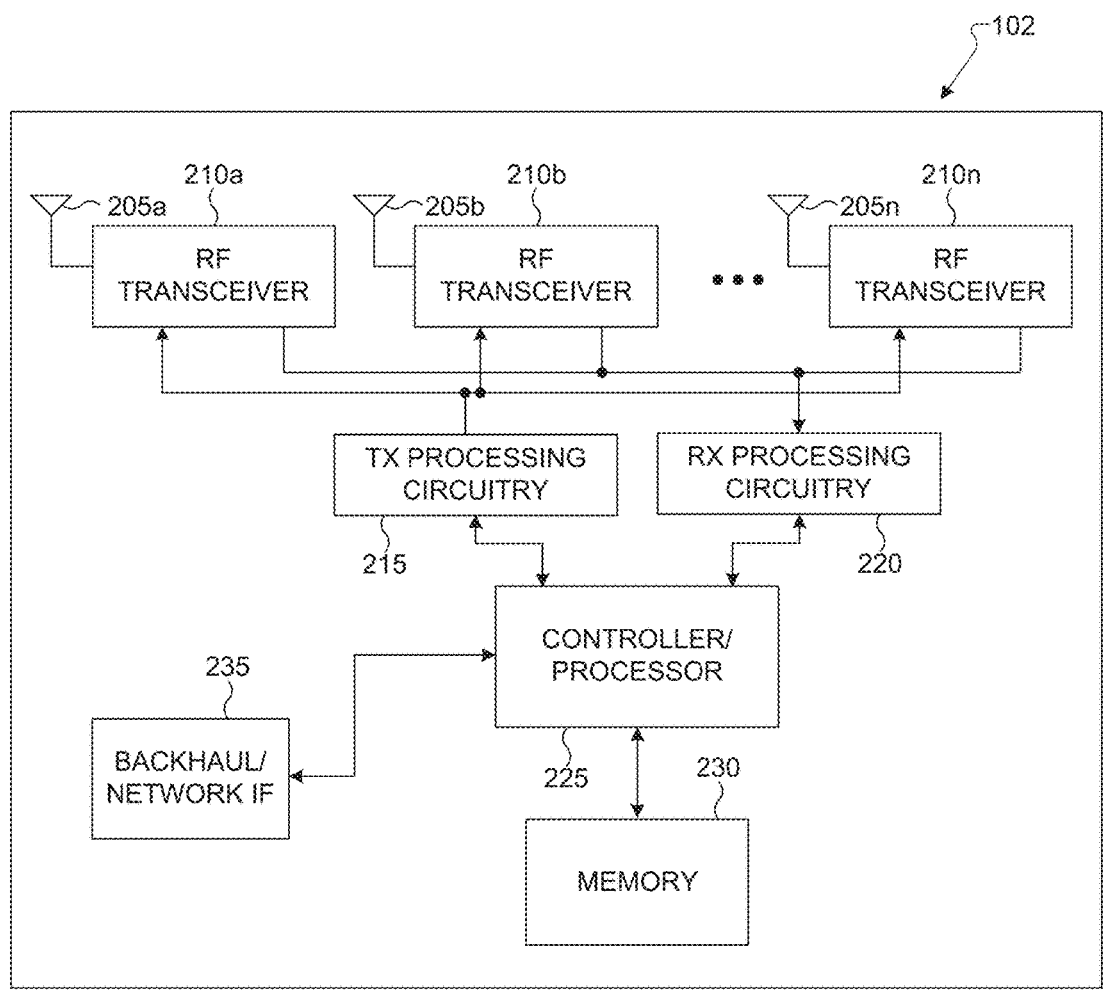
FIG. 2 illustrates an example eNodeB (eNB) according to embodiments of the present disclosure.
Figure 3:
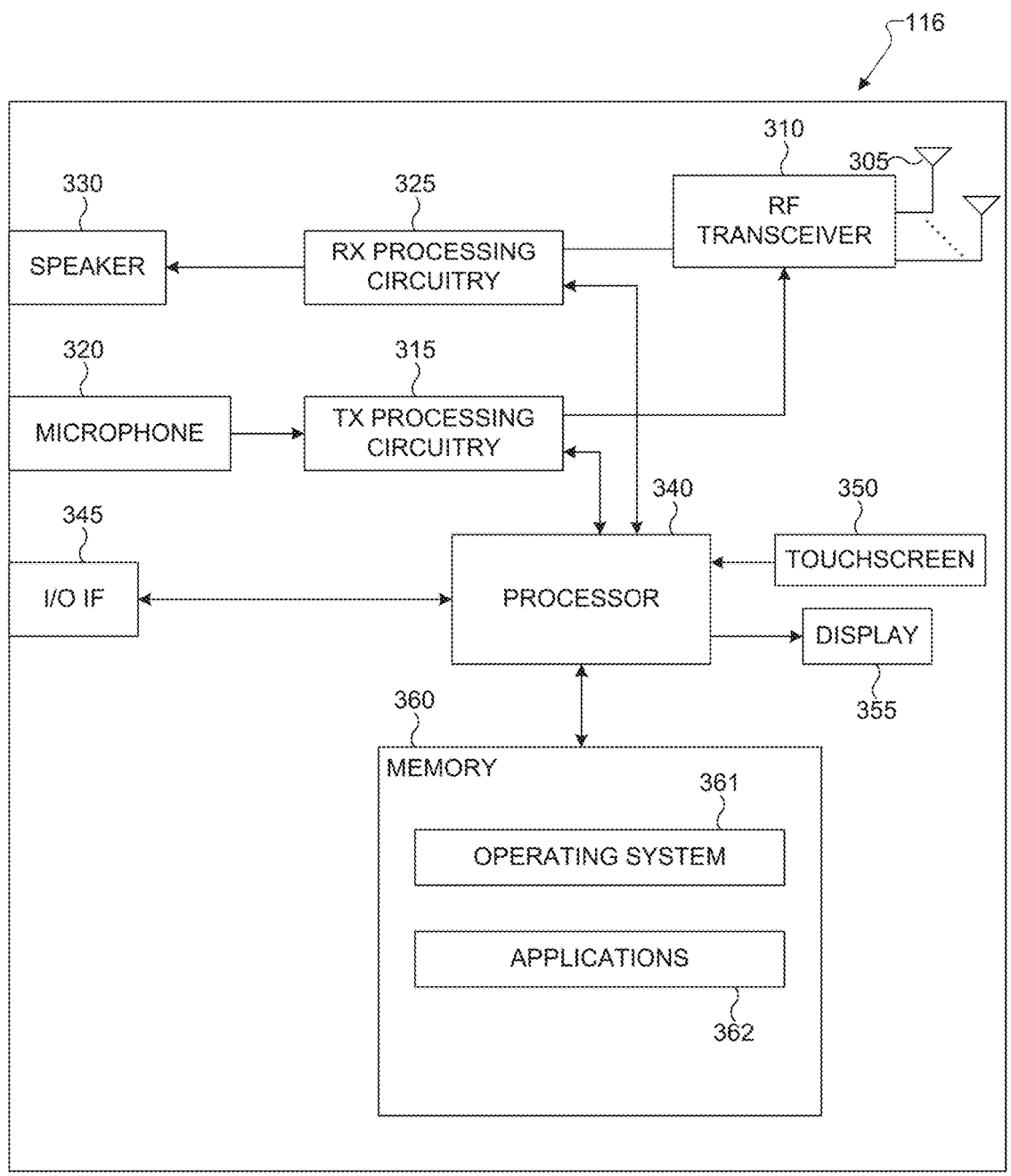
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on uplink channel in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n is capable of transmitting CSI configuration information to receive a wideband periodic CSI including a pre-coding matrix indicator (PMI) based on a linear combination (LC) codebook and receiving a first CSI feedback comprising the RI and RPI in a first instance of a plurality of periodic reporting.

In some embodiments, the RF transceivers 210a-210n is capable of receiving a second CSI feedback comprising an indicator ($i_{1,1}$, $i_{1,2}$) in a second instance of a plurality of periodic reporting transmitted over an uplink channel and a third CSI feedback including the second PMI ($i_2$) in a third instance of a plurality of periodic reporting.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programing, or a combination thereof for processing of CSI reporting on an uplink channel. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving CSI configuration information to report a wideband periodic CSI including a pre-coding matrix indicator (PMI) based on a linear combination (LC) codebook and transmitting a first CSI feedback comprising the RI and RPI in a first instance of a plurality of periodic reporting.

In some embodiments, the RF transceiver 310 is capable of transmitting a second CSI feedback comprising the indicator ($i_{1,1}$, $i_{1,2}$) in a second instance of a plurality of periodic reporting transmitted over an uplink channel and transmitting the third CSI feedback including the second PMI ($i_2$) in a third instance of a plurality of periodic reporting transmitted over an uplink channel.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on an uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is capable of determining a rank indicator (RI) and a relative power indicator (RPI) indicating a power of weights assigned to the plurality of beams and an indicator ($i_{1,1}$, $i_{1,2}$) included in the first PMI ($i_1$) to indicate the plurality of beams comprising a first DFT vector and a second DFT vector.

In some embodiments, the processor 340 is capable of determining a threshold value for a number of CSI bits based on the uplink channel, applying a codebook subsampling operation for a third CSI feedback, and determining a subsampled codebook, the second PMI (12) indicating the plurality of weights for the linear combination of the plurality of beams comprising a first DFT vector and a second DFT vector The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
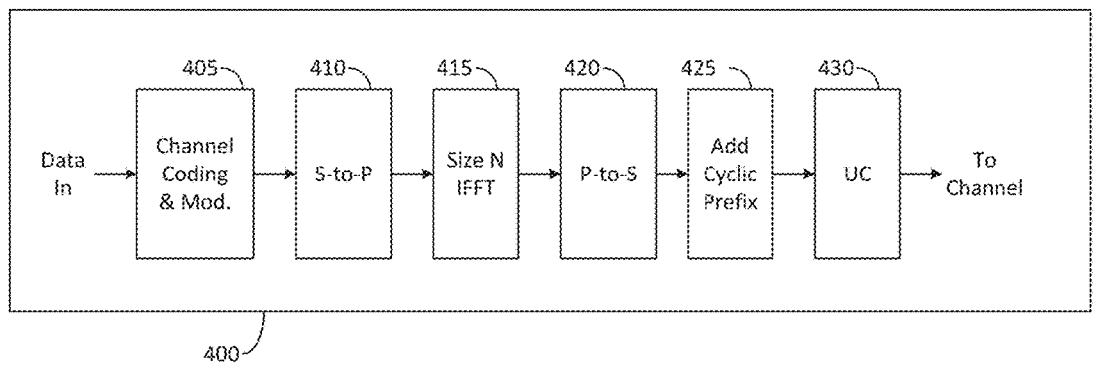
FIG. 4A illustrates a high-level diagram of an orthogonal frequency division multiple access transmit path according to embodiments of the present disclosure.
Figure 4B:
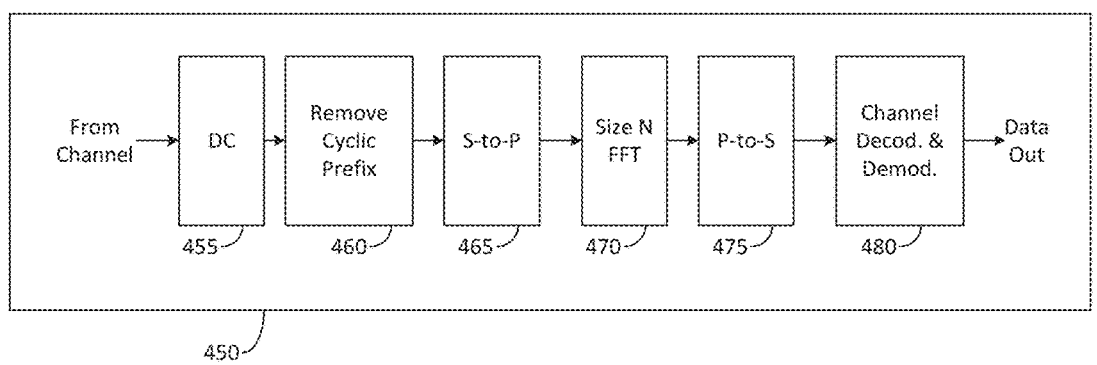
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. LTE specification) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
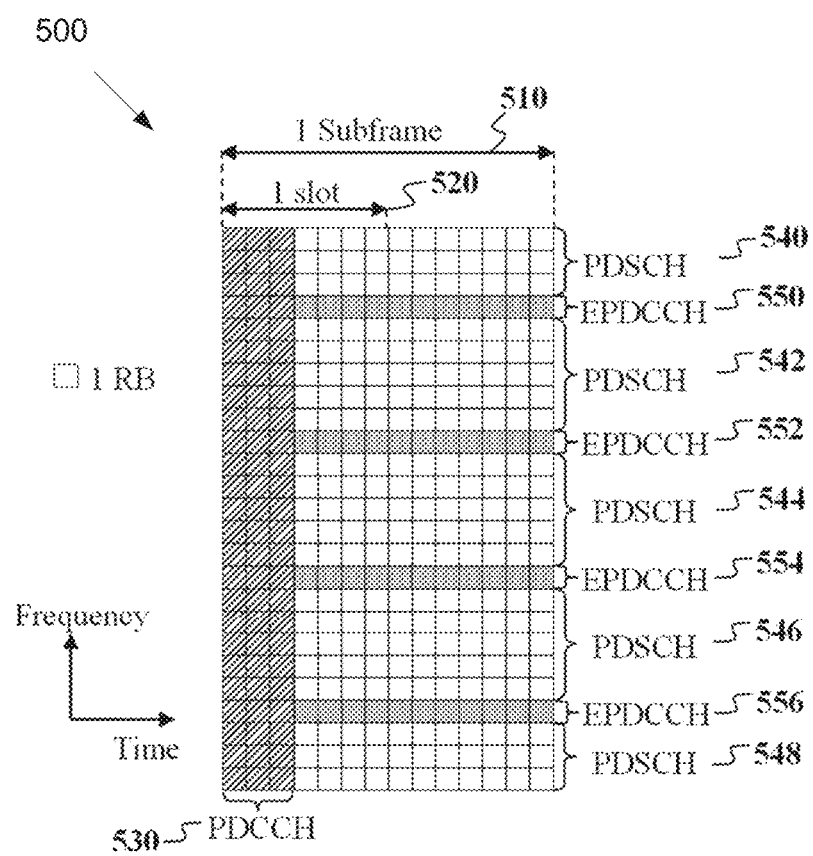
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCI}$ RBs for a total of $Z=O_F+\lfloor(n_{s0}+y\cdot N_{EPDCCH})/D\rfloor$ REs for a PDSCH transmission BW. An EPDCCH transmission is achieved in either one RB or multiple of RBs.

Figure 6:
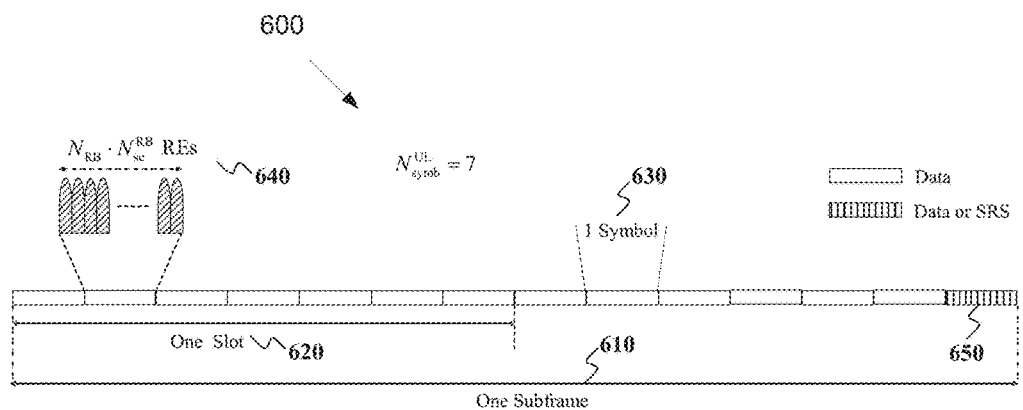
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB}\cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 7:
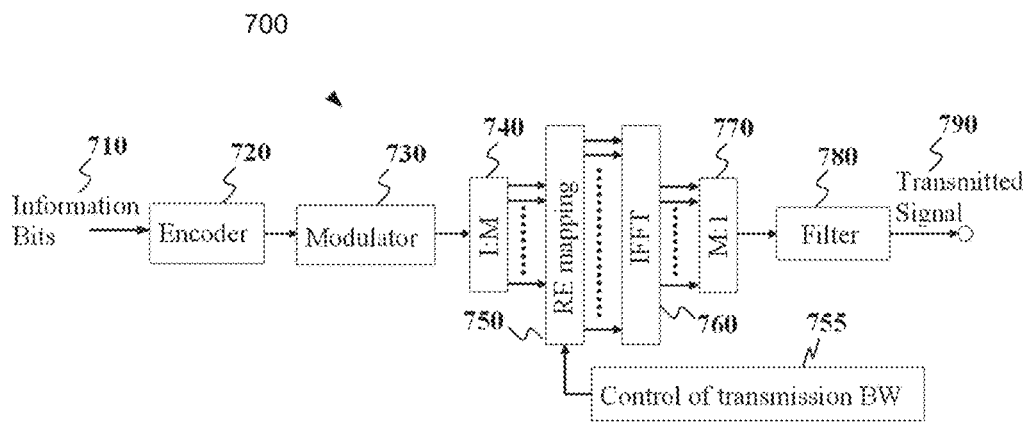
FIG. 7 illustrates an example transmitter block diagram for a physical downlink shared channel (PDSCH) subframe according to embodiments of the present disclosure.

FIG. 7 illustrates an example transmitter block diagram 700 for a physical downlink shared channel (PDSCH) subframe according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast Fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
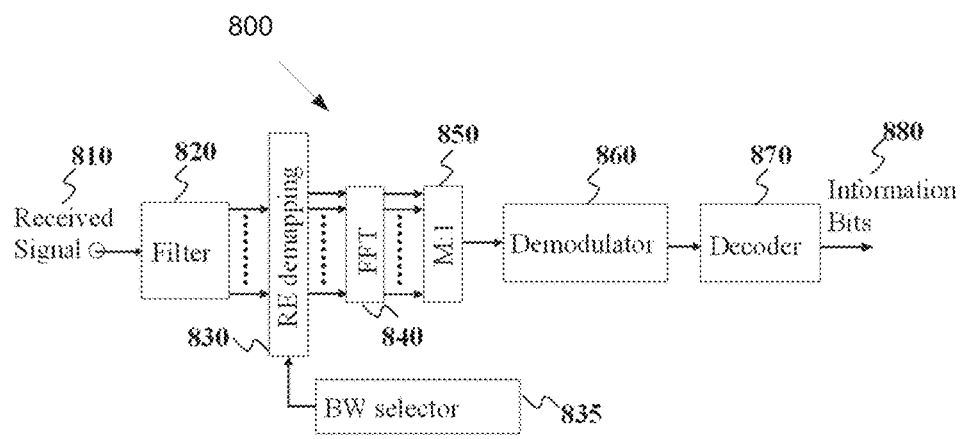
FIG. 8 illustrates an example receiver block diagram for a PDSCH subframe according to embodiments of the present disclosure.

FIG. 8 illustrates an example receiver block diagram 800 for a packet data shared channel (PDSCH) subframe according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping block 830 assigns a reception bandwidth (BW) that is selected by a BW selector 835. The BW selector 835 is configured to control a transmission BW. A fast Fourier transform (FFT) circuit 840 applies a FFT. The output of the FFT circuit 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
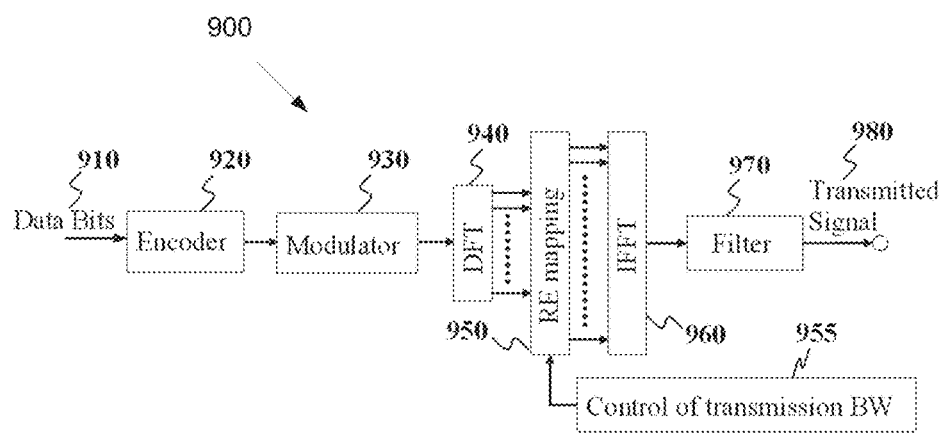
FIG. 9 illustrates an example transmitter block diagram for a physical uplink shared channel (PUSCH) subframe according to embodiments of the present disclosure.

FIG. 9 illustrates a transmitter block diagram 900 for a physical uplink shared channel (PUSCH) subframe according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
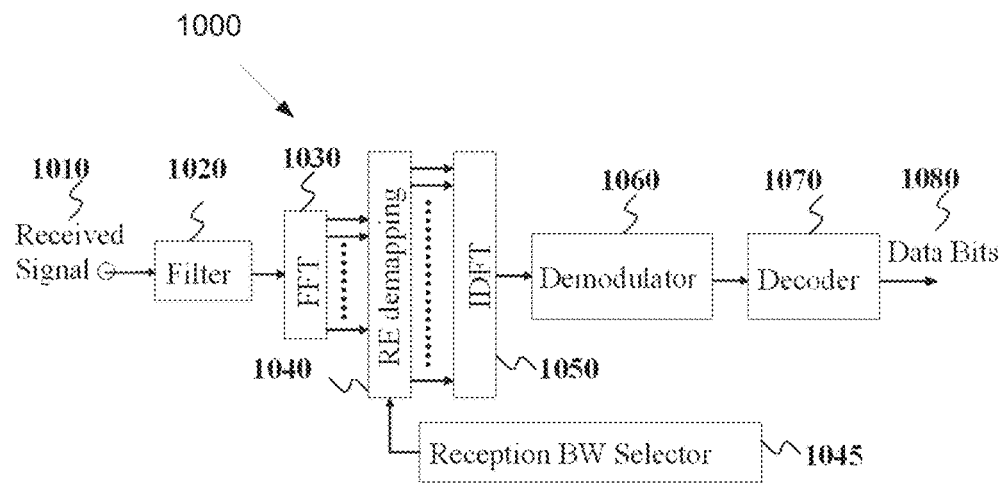
FIG. 10 illustrates an example receiver block diagram for a physical uplink shared channel (PUSCH) in a subframe according to embodiments of the present disclosure.

FIG. 10 illustrates an example receiver block diagram 1000 for a PUSCH subframe according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
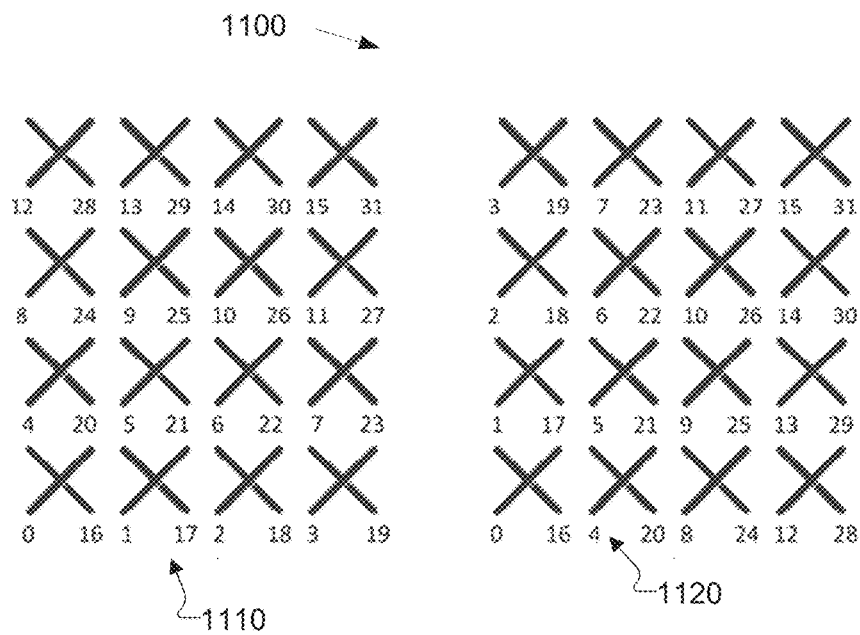
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in LTE specification of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of "CLASS A" codebook for eight, twelve, or sixteen antenna ports (also known as "nonPrecoded"); and single-stage eMIMO-Type of "CLASS B" codebook for two, four, or eight antenna ports (also known as "beamformed").

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \lfloor W_{1,2} (i_{1,2})$. The precoder $W_2$ ($i_2$), therefore, performs a linear transformation of the long-term component such as a linear combination of a set of basic functions or vectors associated with the column vectors of $W_{1,1}$ ($i_{1,1}) \lfloor W_{1,2}(i_{1,2}))$.

$$W(i_{1,1}, i_{1,2}, i_2) = \underbrace{(W_{1,1}(i_{1,1}) \otimes W_{1,2}(i_{1,2}))}_{W_1(i_{1,1},i_{1,2})} W_2(i_2) \qquad \text{Equation 1}$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with "CLASS A" eMIMO-Type which corresponds to NP CSI-RS. Other than channel quality indicator (CQI) and rank indicator (RI), channel state information (CSI) reports associated with "CLASS A" or "nonPrecoded" eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible. UE complexity reduction is also evident since the configured number of ports tends to be much smaller than NP CSI-RS counterpart of the UE. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with "CLASS B" eMIMO-Type which corresponds to BF CSI-RS. Other than CQI and RI, CSI reports associated with "CLASS B" or "beamformed" eMIMO-Type (with one CSI-RS resource and alternative codebook) include a one-component PMI n. Although a single PMI defined with respect to a distinct codebook, this PMI can be associated with the second-stage PMI component of "CLASS A"/"nonPrecoded" codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in LTE specification, the support of these two types of CSI-RS is given in terms of two eMIMO-Types: "CLASS A" (with one CSI-RS resource) and "CLASS B" (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in Table 1.

TABLE 1

CQI and PMI Feedback Types for PUSCH CSI reporting Modes

|  |  | PMI Feedback Type | | |
|---|---|---|---|---|
|  |  | No PMI | Single PMI | Multiple PMI |
| PUSCH CQI Feedback Type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 | Mode 3-2 |

TABLE 2

CQI and PMI Feedback Types for PUCCH CSI reporting Modes

|  |  | PMI Feedback Type | |
|---|---|---|---|
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

According to the WI, the hybrid CSI reporting based on non-precoded and beamformed CSI-RS associated with two eMIMO-Types may be supported in LTE specification.

In the present disclosure, for brevity, FDD is considered as the duplex method for both DL and UL signaling but the embodiments of the present disclosure are also directly applicable to TDD.

Throughout the present disclosure, 2D dual-polarized array is used solely for illustrative purposes, unless stated otherwise. Extensions to 2D single-polarized array are straightforward for those skilled in the art.

Terms such as "non-precoded" (or "NP") CSI-RS and "beamformed" (or "BF") CSI-RS are used throughout this present disclosure. The essence of this present disclosure does not change when different terms or names are used to refer to these two CSI-RS types. The same holds for CSI-RS resource. CSI-RS resources associated with these two types of CSI-RS can be referred to as "a first CSI-RS resource" and "a second CSI-RS resource," or "CSI-RS-A resource" and "CSI-RS-B resource." Subsequently, the labels "NP" and "BF" (or "np" and "bf") are exemplary and can be substituted with other labels such as "1" and "2." "A" or "B." Alternatively, instead of using categories such as CSI-RS type or CSI-RS resource type, a category of CSI reporting class can also be used. For instance, NP CSI-RS is associated with eMIMO-Type of "CLASS A" while UE-specific BF CSI-RS is associated with eMIMO-Type of "CLASS B" with one CSI-RS resource.

Figure 12:
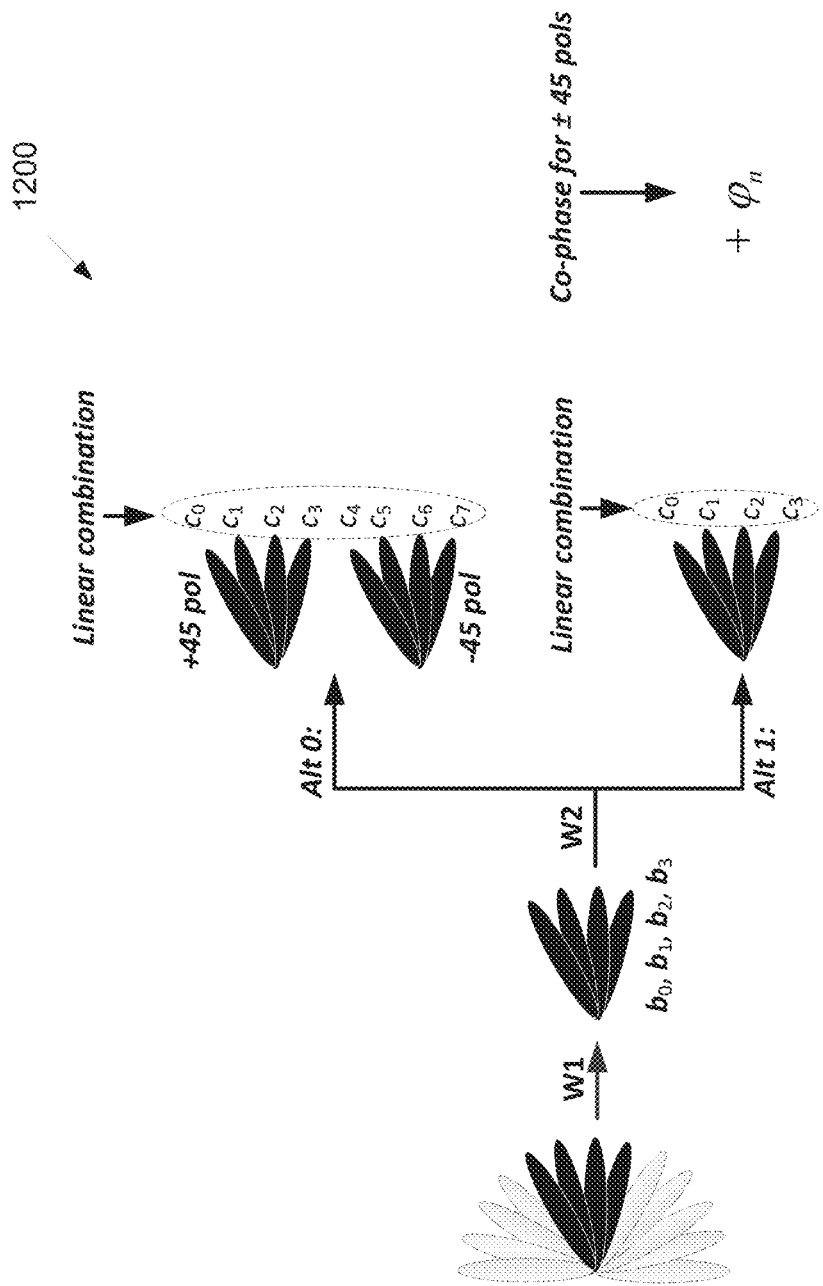
FIG. 12 illustrates an example linear combination pre-coding matrix indicator (PMI) pre-coder (L=4) according to embodiments of the present disclosure.

FIG. 12 illustrates an example linear combination pre-coding matrix indicator (PMI) 1200 pre-coder (L=4) according to embodiments of the present disclosure. An embodiment of the linear combination pre-coding matrix indicator (PMI) 1200 pre-coder (L=4) shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In some embodiment, a UE is configured with a linear combination (LC) codebook: $W=W_1W_2$, where $W_1$ is for WB and long-term first PMI $i_1$ or PMI pair $(i_{1,1},i_{1,2})$ feedback, which indicates a 2×2 block diagonal matrix with identical diagonal block, an $N_1N_2 \times L$ matrix, whose columns correspond to L DFT beams, and $W_2$ is for SB and short-term second PMI $i_2$ feedback, which indicates a coefficient vector for linear combination.

Depending on whether the co-phase for two polarizations are separately considered (e.g., Alt 1) or not (e.g., Alt 0), two alternatives are considered for LC coefficients as shown in FIG. 12. In one embodiment of Alt 0, 2L coefficients are considered. In another embodiment of Alt 1, L co-phases and L coefficients are considered. For simplicity, in the rest of the present disclosure, the term coefficients for both alternatives are used, indicated by the second PMI $i_2$.

The UE is configured with one of non-orthogonal (LTE specification Class A rank 1 W1 basis) and orthogonal W1 basis (LTE specification Class A rank 7 W1 basis) using RRC parameter Codebook-Config signaling, where for: Codebook-Config=2, 3, 4, W1 codebook corresponds to the rank 1 W1 codebook in LTE specification (and W1 codebook extension in LTE specification) Class A codebook for both rank 1 and 2 LC codebook; and Codebook-Config 1, W1 codebook corresponds to the rank 7 W1 codebook in LTE specification (and W1 extension in LTE specification) Class A codebook for both rank 1 and 2 LC codebook. In one example of 1D antenna port layouts, the Class A rank 7 W1 codebook corresponds to Codebook-Config=4. In another example of 2D antenna port layouts, the Class A rank 7 W1 codebook corresponds to Codebook-Config=2.

Figure 13:
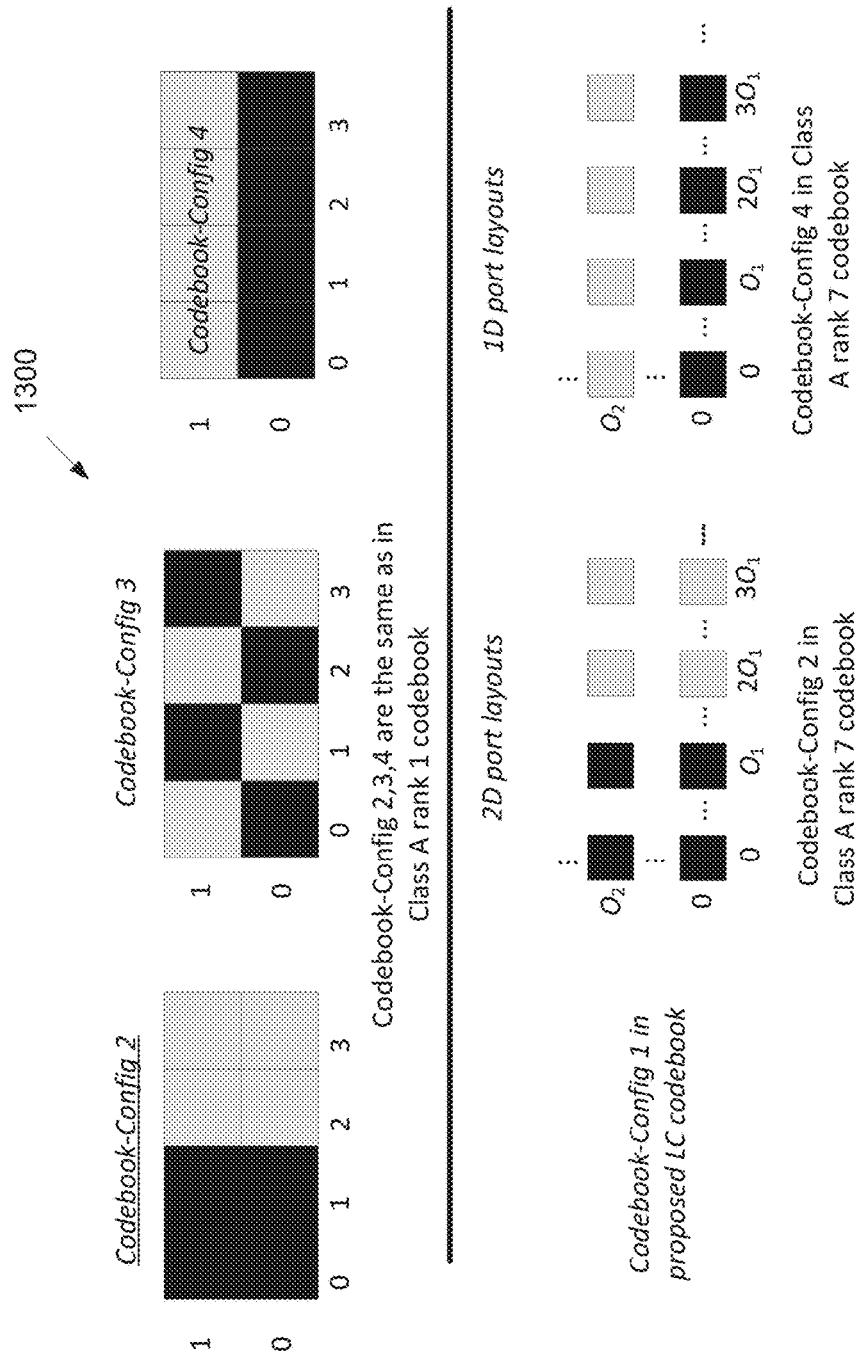
FIG. 13 illustrates an example W1 codebook according to embodiments of the present disclosure.

FIG. 13 illustrates an example W1 codebook 1300 according to embodiments of the present disclosure. An embodiment of the W1 codebook 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13, if Codebook-Config 1 is configured for LC codebook CB4-2, then for 1D port layouts, 4 orthogonal beams (shown as black squares) form a line and correspond to Codebook-Config 4 in LTE specification rank 7 Class A codebook, and for 2D port layouts, 4 orthogonal beams (shown as black squares in FIG. 13) form a square and correspond to Codebook-Config 2 in LTE specification 13 rank 7 Class A codebook.

The further details of the $W_1$ and $W_2$ codebook are as follows. In one embodiment of Codebook-Config=1, $W_1$ codebook comprises of the following components. In one example, $W_1$ codebook comprises fixed orthogonal basis as in LTE specification Class A rank 7 $W_1$ codebook for Codebook-Config=2 (2D port layouts) and 4 (1D port layouts). In another example, $W_1$ codebook comprises L={2, 4} beams which are selected WB from the selected orthogonal basis; and Strongest beam index. In such examples, there are two alternatives for the strongest beam indication: the beam at (0,0) is the strongest beam, so no indication is needed; and the index of the strongest beam in the reported orthogonal basis is indicated, which requires $\log_2 4=2$ bits indication. In such instance, if L=2, then index of remaining 1 out of 3 beam, which requires $$\log_2 \binom{3}{1} = 2 \text{ bits.}$$

In another example, $W_1$ codebook comprises beam power levels for L−1 beams assuming 2 bits per beam, it requires 2(L−1) bits. Note that the strongest beam power is 1. In such example, an example of 2-bit beam power codebook is {1, 0.5, 0.25, 0.125} and another example of 2-bit beam power codebook is {1, 0.5, 0.25, 0}. Note that the squared root of the beam power is multiplied to each beam in the selected beam group.

In one embodiment of Codebook-Config=1, $W_2$ codebook comprises LC coefficient vectors $c^{(r)}=[1 \ c_1^{(r)} \ldots c_{L-1}^{(r)} \ \phi_0^{(r)} \phi_1^{(r)} c_1^{(r)} \ldots \phi_{L-1}^{(r)} c_{L-1}^{(r)}]^T$ where r=0, R−1 are for R layers, $[\phi_0^{(r)} \phi_1^{(r)} \ldots \phi_{L-1}^{(r)}]^T$ are L co-phase values for layer r, $[1 \ c_1^{(r)} \ldots c_{L-1}^{(r)}]^T$ are L coefficients for layer r, and both $\phi_l^{(r)}$ and $c_l^{(r)}$ belong to QPSK alphabet for each r and l. The detailed proposal about $W_2$ codebook is provided later in the present disclosure.

In some embodiments of Codebook-Config=2, 3, 4, $W_1$ codebook comprises of non-orthogonal basis as in LTE specification Class A rank 1 $W_1$ codebook for Codebook-Config=2, 3, 4; and $W_2$ codebook comprises of the following components. In one example, the $W_2$ codebook comprises L={2, 4} beams which are selected SB. In another example, the $W_2$ codebook comprises, if L=2, one of the following two beam selection options are supported: for option 0, 2 out of 4 beams (6 such combinations) are selected; and for option 1, either 1 out of 4 beams (4 such combinations) or 2 out of 4 beams (6 such combinations) are selected. In yet another example, the $W_2$ codebook comprises LC coefficient vectors $c^{(r)}$ as explained for Codebook-Config=1.

The $W_1$ beam group can then be expressed as $$W_1 = \begin{bmatrix} B \cdot P & 0 \\ 0 & B \cdot P \end{bmatrix},$$

where $B=[b_{k_{1,0},k_{2,0}} b_{k_{1,1},k_{2,1}} \ldots b_{k_{1,L-1},k_{2,L-1}}]$ whose columns correspond to L $W_1$ beams; and $$P = \begin{bmatrix} 1 & 0 & 0 & 0 \\ 0 & p_1 & 0 & 0 \\ 0 & 0 & \ddots & 0 \\ 0 & 0 & 0 & p_{L-1} \end{bmatrix}$$

if Codebook-Config=1, then $p_i$ corresponds to the squared-root of beam power; otherwise P is an identity matrix.

The spacing between leading beams of two adjacent beam groups, denoted as $(s_1, s_2)$, determines the number of bits needed to indicate a beam group using the first PMI pair $$(i_{1,1}, i_{1,2}): i_{1,1} = 0, 1, \ldots \frac{N_1 O_1}{s_1} - 1 \text{ and } i_{1,2} = 0, 1, \ldots \frac{N_2 O_2}{s_2} - 1$$

indicate a $W_1$ beam group.

Since the oversampling factor $(O_1, O_2)$ can take a value from $\{(4, 4), (8, 4), (8, 8), (4, -), (8, -)\}$ depending on the antenna port layouts, for simplicity, we propose to set $(s_1, s_2)=(O_1/4, O_2/4)$ for 2D port layouts and $(O_1/4, -)$ for 1D port layouts, regardless of the number configured $(O_1, O_2)$ value and Codebook-Config.

For rank 1, the UE reports CSI using the proposed rank 1 LC codebook, and for rank 2-8 CSI reporting, the UE reports CSI using LTE specification codebooks such as rank 2-8 Class A codebooks. Alternatively, for rank 1 and 2 CSI reporting, the UE reports CSI using the proposed LC codebook, and for rank 3-8 CSI reporting, the UE reports CSI using LTE specification codebooks such as rank 3-8 Class A codebooks.

In LTE specification, the periodic CSI based on Class A codebook is reported using PUCCH Format 2/2a/2b (max 11 bits CSI) in three CSI reporting instances (PUCCH mode 1-1) where: $1^{st}$ reporting instance is for RI (3 bits) reporting; $2^{nd}$ reporting instance is for the first PMI pair $(i_{1,1}, i_{1,2})$ reporting; and $3^{rd}$ reporting instance is for the second PMI $i_2$ and CQI reporting.

Figure 14:
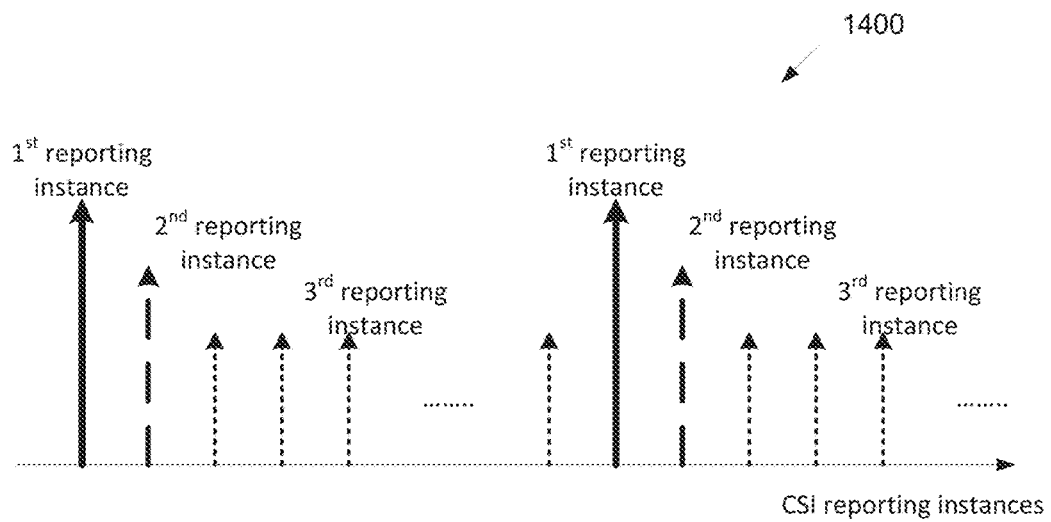
FIG. 14 illustrates an example CSI reporting based according to embodiments of the present disclosure.

FIG. 14 illustrates an example CSI reporting 1400 based according to embodiments of the present disclosure. An embodiment of the CSI reporting 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured to report proposed LC codebook based periodic CSI using PUCCH Format 2/2a/2b in three CSI reporting instances (PUCCH mode 1-1), as shown in FIG. 14, by performing subsampling of the proposed LC codebook.

In some embodiments of 0, if a UE is configured the LC codebook with Codebook-Config=1 and L=2, then for periodic reporting of rank 1 CSI using PUCCH Format 2/2a/2b (PUCCU mode 1-1), the UE performs codebook subsampling according to one of the following alternatives. In one embodiment of Alt 0-0, beam (0, 0) is considered as the strongest beam. The CSI content of the three reporting instance are as follows. In one example, $1^{st}$ reporting instance is for RI reporting, which requires 3 bits. In another example, $2^{nd}$ reporting instance is for the $1^{st}$ PMI pair $(i_{1,1}, i_{1,2})$ reporting, which indicates: a beam group comprising of 4 beams, similar to LTE specification Class A rank 1 W1, which requires maximum 8 bits; index of the remaining 1 out of 3 beams, which requires 2 bits; and power of the remaining 1 beam selected from a subsampled 1-bit beam power codebook [1, 0.5], which requires 1 bit. In total, the number of bits reported in the $2^{nd}$ reporting instance is 8+2+1=11 bits. In yet another example, $3^{rd}$ reporting instance is for the $2^{nd}$ PMI $i_2$ reporting, which indicates 3 coefficients from a QPSK $\{1, j, -1, -j\}$ alphabet, which requires 6 bits, and together with 4-bit CQI, 4+6=10 bits for $(i_2, CQI)$ is reported in $3^{rd}$ CSI reporting instance.

In some embodiments of Alt 0-1, equal beam power is considered for all beams, and hence indication about the strongest beam and beam power levels are not needed. The CSI content of the three reporting instances is as follows. In one example, $1^{st}$ reporting instance is for RI reporting, which requires 3 bits. In another example, 2nd reporting instance is for the 1st PMI pair $(i_{1,1}, i_{1,2})$ reporting, which indicates: a beam group comprising of 4 beams, similar to LTE specification Class A rank 1 W1, which requires maximum 8 bits; and 2 out of 4 beam selection, which requires 3 bits. In total, the number of bits reported in the $2^{nd}$ reporting instance is 8+3=11 bits. In yet another example, $3^{rd}$ reporting instance is for the $2^{nd}$ PMI $i_2$ reporting, which indicates 3 coefficients from a QPSK $\{1, j, -1, -j\}$ alphabet, which requires 6 bits, and together with 4-bit CQI, 4+6=10 bits for $(i_2, CQI)$ is reported in $3^{rd}$ CSI reporting instance.

In some embodiments of Alt 0-2, $i_{1,1}$ and $i_{1,2}$ reporting in $1^{st}$ and $2^{nd}$ reporting instances are considered, respectively. The CSI content of the three reporting instances is as follows. In one example, $1^{st}$ reporting instance is for (RI, $i_{1,1}$) reporting, which requires 3+6=9 bits at the most (which corresponds to 1D port layout with $N_1=16$). In another example, 2nd reporting instance is for $i_{1,2}$ reporting, which indicates: a beam group in the $2^{nd}$ dimension, which requires maximum 5 bits at the most (which corresponds to 2D port layout with $N_2=8$); index of the strongest beam, which requires 2 bits; index of the remaining 1 out of 3 beams, which requires 2 bits; and power of the remaining 1 beam selected from the 2-bit beam power codebook, which requires 2 bits. In total, the number of bits reported in the $2^{nd}$ reporting instance is 5+2+2+2=11 bits. In yet another example, $3^{rd}$ reporting instance is for the $2^{nd}$ PMI $i_2$ reporting, which indicates 3 coefficients from a QPSK $\{1, j, -1, -j\}$ alphabet, which requires 6 bits, and together with 4-bit CQI, 4+6=10 bits for $(i_2, CQI)$ is reported in $3^{rd}$ CSI reporting instance.

In some embodiments of Alt 0-3, $i_{1,2}$ and $i_{1,1}$ reporting in $1^{st}$ and $2^{nd}$ reporting instances are considered, respectively. The CSI content of the three reporting instance are as follows. In one example, $1^{st}$ reporting instance is for (RI, $i_{1,2}$) reporting, which requires 3+5=9 bits at the most (which corresponds to 2D port layout with $N_2=8$). In yet another example, 2nd reporting instance is for $i_{1,1}$ reporting, which indicates: a beam group in the 1$^{st}$ dimension, which requires maximum 6 bits at the most (which corresponds to 1D port layout with $N_1$=16); index of the strongest beam, which requires 2 bits; index of the remaining 1 out of 3 beams, which requires 2 bits; and power of the remaining 1 beam selected from a subsampled 1-bit beam power codebook [1, 0.5], which requires 1 bit. In total, the number of bits reported in the 2$^{nd}$ reporting instance is 6+2+2+1=11 bits. In yet another example, 3$^{rd}$ reporting instance is for the 2$^{nd}$ PMI $i_2$ reporting, which indicates 3 coefficients from a QPSK {1, j, −1, −j} alphabet, which requires 6 bits, and together with 4-bit CQI, 4+6=10 bits for ($i_2$, CQI) is reported in 3$^{rd}$ CSI reporting instance.

In some embodiments, only one of Alt 0-0 to Alt 0-3 may be supported in the specification. In another alternative, a UE may be configured with one Alt 0-0 to Alt 0-3 via higher layer RRC signaling. For example, this configuration may depend on the antenna port layout ($N_1$, $N_2$) configuration.

In some embodiment of 1, if a UE is configured the LC codebook with Codebook-Config=1 and L=4, then for periodic reporting of rank 1 CSI using PUCCH Format 2/2a/2b (PUCCU mode 1-1), the UE performs codebook subsampling according to one of the following alternatives.

In some embodiments of Alt 1-0, beam (0, 0) is considered as the strongest beam. The CSI content of the three reporting instance are as follows. In one example, 1$^{st}$ reporting instance is for RI reporting, which requires 3 bits. In another example, 2$^{nd}$ reporting instance is for the 1$^{st}$ PMI pair ($i_{1,1}$, $i_{1,2}$) reporting, which indicates: a beam group comprising of 4 beams, similar to LTE specification Class A rank 1 W1, which requires maximum 8 bits; and power of each of the remaining 3 beam selected from a subsampled 1-bit beam power codebook [1, 0.5], which requires 3 bits. In total, the number of bits reported in the 2$^{nd}$ reporting instance is 8+3=11 bits. In yet another example, 3$^{rd}$ reporting instance is for the 2$^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in 3$^{rd}$ CSI reporting instance.

In some embodiments of Alt 1-1, equal beam power for all beams is considered, and hence indication about the strongest beam and beam power levels are not needed. The CSI content of the three reporting instance are as follows. In one example, 1$^{st}$ reporting instance is for RI reporting, which requires 3 bits. In another example, 2nd reporting instance is for the 1st PMI pair ($i_{1,1}$, $i_{1,2}$) reporting, which indicates a beam group comprising of 4 beams, similar to LTE specification Class A rank 1 W1, which requires maximum 8 bits. So, the number of bits reported in the 2$^{nd}$ reporting instance is 8 bits. In yet another example, 3$^{rd}$ reporting instance is for the 2$^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in 3$^{rd}$ CSI reporting instance.

In some embodiments of Alt 1-2, 1-bit beam power common for remaining 3 beams is considered. The CSI content of the three reporting instances is as follows. In one example, 1$^{st}$ reporting instance is for RI reporting, which requires 3 bits. In another example, 2$^{nd}$ reporting instance is for the 1$^{st}$ PMI pair ($i_{1,1}$, $i_{1,2}$) reporting, which indicates: a beam group comprising of 4 beams, similar to LTE specification Class A rank 1 W1, which requires maximum 8 bits; index of the strongest beam, which requires 2 bits; and power level common for the remaining 3 beam selected from a subsampled 1-bit beam power codebook [1, 0.5], which requires 1 bit. In total, the number of bits reported in the 2$^{nd}$ reporting instance is 8+2+1=11 bits. In yet another example, 3$^{rd}$ reporting instance is for the 2$^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in 3$^{rd}$ CSI reporting instance.

In some embodiments of Alt 1-3, $i_{1,1}$ and $i_{1,2}$ reporting in 1$^{st}$ and 2$^{nd}$ reporting instances are considered, respectively. The CSI content of the three reporting instances is as follows. In one example, 1$^{st}$ reporting instance is for (RI, $i_{1,1}$) reporting, which requires 3+6=9 bits at the most (which corresponds to 1D port layout with $N_1$=16). In another example, 2nd reporting instance is for $i_{1,2}$ reporting, which indicates: a beam group in the 2$^{nd}$ dimension, which requires maximum 5 bits at the most (which corresponds to 2D port layout with $N_2$=8); index of the strongest beam, which requires 2 bits; and power of the remaining 3 beam selected from the subsampled 1-bit beam power codebook [1, 0.5], which requires 3 bits. In total, the number of bits reported in the 2$^{nd}$ reporting instance is 5+2+3=10 bits. In yet another example, 3$^{rd}$ reporting instance is for the 2$^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in 3$^{rd}$ CSI reporting instance.

In some embodiments of Alt 1-4, $i_{1,2}$ and $i_{1,1}$ reporting in 1$^{st}$ and 2$^{nd}$ reporting instances are considered, respectively. The CSI content of the three reporting instances is as follows. In one example, 1$^{st}$ reporting instance is for (RI, $i_{1,2}$) reporting, which requires 3+5=9 bits at the most (which corresponds to 2D port layout with $N_2$=8). In another example, 2nd reporting instance is for $i_{1,1}$ reporting, which indicates: a beam group in the 1$^{st}$ dimension, which requires maximum 6 bits at the most (which corresponds to 1D port layout with $N_1$=16); index of the strongest beam, which requires 2 bits; and power of the remaining 3 beam selected from the subsampled 1-bit beam power codebook [1, 0.5], which requires 3 bits. In total, the number of bits reported in the 2$^{nd}$ reporting instance is 6+2+3=11 bits. In yet another example, 3$^{rd}$ reporting instance is for the 2$^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in 3$^{rd}$ CSI reporting instance.

In one alternative, only one of Alt 1-0 to Alt 1-4 may be supported in the specification. In another alternative, a UE may be configured with one Alt 1-0 to Alt 1-4 via higher layer RRC signaling. For example, this configuration may depend on the antenna port layout ($N_1$, $N_2$) configuration.

In some embodiments of 2, if a UE is configured the LC codebook with Codebook-Config=2, 3, or 4, and L=2, then for periodic reporting of rank 1 CSI using PUCCH Format 2/2a/2b (PUCCU mode 1-1), the UE reports CSI in three reporting instances as follows. In one example, 1st reporting instance is for RI reporting, which requires 3 bits. In another example, 2$^{nd}$ reporting instance is for the 1$^{st}$ PMI pair ($i_{1,1}$, $i_{1,2}$) reporting, which indicates: a beam group comprising of 4 beams, similar to LTE specification Class A rank 1 W1, which requires maximum 8 bits; and 2 out of 4 beam selection, which requires 3 bits. In total, the number of bits reported in the 2$^{nd}$ reporting instance is 8+3=11 bits. In yet another example, 3$^{rd}$ reporting instance is for the 2$^{nd}$ PMI $i_2$ reporting, which indicates 3 coefficients from a QPSK {1, j, −1, −j} alphabet, which requires 6 bits, and together with 4-bit CQI, 4+6=10 bits for ($i_2$, CQI) is reported in 3$^{rd}$ CSI reporting instance.

In some embodiments of 3, if a UE is configured the LC codebook with Codebook-Config=2, 3, or 4, and L=4, then for periodic reporting of rank 1 CSI using PUCCH Format 2/2a/2b (PUCCU mode 1-1), the UE reports CSI in three reporting instances as follows. In one example, $1^{st}$ reporting instance is for RI reporting, which requires 3 bits. In another example, $2^{nd}$ reporting instance is for the $1^{st}$ PMI pair ($i_{1,1}$, $i_{1,2}$) reporting, which indicates a beam group comprising of 4 beams, similar to LTE specification Class A rank 1 W1, which requires maximum 8 bits. So, the number of bits reported in the $2^{nd}$ reporting instance is 8 bits. In yet another example, $3^{rd}$ reporting instance is for the $2^{nd}$ PMI $i_2$ reporting, which indicates 7 coefficients selected from a subsampled BPSK {1, −1} alphabet, which requires 7 bits, and together with 4-bit CQI, 4+7=11 bits for ($i_2$, CQI) is reported in $3^{rd}$ CSI reporting instance.

In some embodiments of 4, if a UE is configured the LC codebook with Codebook-Config=1 and L=2, then for periodic reporting of rank 2 CSI using PUCCH Format 2/2a/2b (PUCCU mode 1-1), the UE performs codebook subsampling according to one of the following alternatives. In one example of Alt 4-0, this alternative is the same as Alt 0-0 except that the $3^{rd}$ CSI reporting instance is for the $2^{nd}$ PMI $i_2$ reporting, which indicates 3 coefficients selected from a subsampled BPSK {1, −1} alphabet, which requires 3 bits, and together with 7-bit rank 2 CQI, 7+3=10 bits for ($i_2$, CQI) is reported in $3^{rd}$ CSI reporting instance. In another example of Alt 4-1, this alternative is the same as Alt 0-1 with the exception about $3^{rd}$ CSI reporting mentioned in Alt 4-0. In yet another example of Alt 4-2, this alternative is the same as Alt 0-2 with the exception about $3^{rd}$ CSI reporting mentioned in Alt 4-0. In yet another example of Alt 4-3, this alternative is the same as Alt 0-3 with the exception about $3^{rd}$ CSI reporting mentioned in Alt 4-0.

In one alternative, only one of Alt 4-0 to Alt 4-3 may be supported in the specification. In another alternative, a UE may be configured with one Alt 4-0 to Alt 4-3 via higher layer RRC signaling. For example, this configuration may depend on the antenna port layout ($N_1$, $N_2$) configuration.

In some embodiments of 5, if a UE is configured the LC codebook with Codebook-Config=1 and L=4, then for periodic reporting of rank 2 CSI using PUCCH Format 2/2a/2b (PUCCU mode 1-1), the UE performs codebook subsampling according to one of the following alternatives. In one example of Alt 5-0, this alternative is the same as Alt 1-0 except that the $3^{rd}$ CSI reporting instance is for the $2^{nd}$ PMI $i_2$ reporting, which indicates 7 coefficients that are constructed according to Alt 1 in FIG. 12, i.e., 3 coefficients and 4 co-phase values. In particular, 3 coefficients are selected from a subsampled BPSK {1, −1} alphabet, which requires 3 bits, and 1 co-phase common for all 4 co-phase values are selected from a subsampled BPSK {1, −1} alphabet, which requires 1 bit. These together with 7-bit rank 2 CQI results in 7+3+1=11 bits for ($i_2$, CQI) reported in $3^{rd}$ CSI reporting instance. In another example of Alt 5-1, this alternative is the same as Alt 1-1 with the exception about $3^{rd}$ CSI reporting mentioned in Alt 5-0. In yet another example of Alt 5-2, this alternative is the same as Alt 1-2 with the exception about $3^{rd}$ CSI reporting mentioned in Alt 5-0. In yet another example of Alt 5-3, this alternative is the same as Alt 1-3 with the exception about $3^{rd}$ CSI reporting mentioned in Alt 5-0. In yet another example of Alt 5-4, this alternative is the same as Alt 1-4 with the exception about $3^{rd}$ CSI reporting mentioned in Alt 5-0.

In one alternative, only one of Alt 5-0 to Alt 5-4 may be supported in the specification. In another alternative, a UE may be configured with one Alt 5-0 to Alt 5-4 via higher layer RRC signaling. For example, this configuration may depend on the antenna port layout ($N_1$, $N_2$) configuration.

In some embodiments of 6, if a UE is configured the LC codebook with Codebook-Config=2, 3, or 4, and L=2, then for periodic reporting of rank 2 CSI using PUCCH Format 2/2a/2b (PUCCU mode 1-1), the UE reports CSI in three reporting instances as in Embodiment 2 except that the $3^{rd}$ CSI reporting instance is for the $2^{nd}$ PMI $i_2$ reporting, which indicates 3 coefficients selected from a subsampled BPSK {1, −1} alphabet, which requires 3 bits, and together with 7-bit rank 2 CQI, 7+3=10 bits for ($i_2$, CQI) is reported in $3^{rd}$ CSI reporting instance.

In some embodiments of 7, if a UE is configured the LC codebook with Codebook-Config=2, 3, or 4, and L=4, then for periodic reporting of rank 2 CSI using PUCCH Format 2/2a/2b (PUCCU mode 1-1), the UE reports CSI in three reporting instances as in Embodiment 3 except that the $3^{rd}$ CSI reporting instance is for the $2^{nd}$ PMI $i_2$ reporting, which indicates 7 coefficients that are constructed according to Alt 1 in FIG. 12, i.e., 3 coefficients and 4 co-phase values. In particular, 3 coefficients are selected from a subsampled BPSK {1, −1} alphabet, which requires 3 bits, and 1 co-phase common for all 4 co-phase values are selected from a subsampled BPSK {1, −1} alphabet, which requires 1 bit. These together with 7-bit rank 2 CQI results in 7+3+1=11 bits for ($i_2$, CQI) reported in $3^{rd}$ CSI reporting instance.

Figure 15:
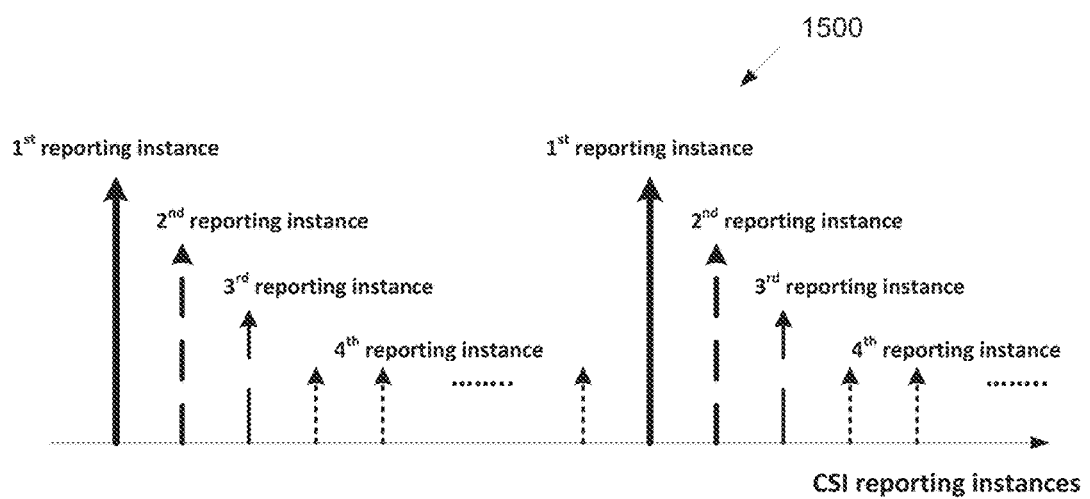
FIG. 15 illustrates another example CSI reporting according to embodiments of the present disclosure.

FIG. 15 illustrates another example CSI reporting 1500 according to embodiments of the present disclosure. An embodiment of the CSI reporting 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured to report proposed LC codebook based periodic CSI using PUCCH Format 2/2a/2b in four CSI reporting instances (PUCCH mode 1-1), as shown in FIG. 15, by performing subsampling of the proposed LC codebook.

In some embodiments of 8, if a UE is configured the LC codebook with Codebook-Config=1, 2, 3, or 4, and L=2, then for periodic reporting of rank 1 or 2 CSI using PUCCH Format 2/2a/2b (PUCCU mode 1-1), the UE reports CSI in four reporting instances which are as follows. In one example, $1^{st}$ reporting instance is for RI reporting, which requires 3 bits. In another example, $2^{nd}$ reporting instance is for the $1^{st}$ PMI pair ($i_{1,1}$, $i_{1,2}$) reporting, which indicates a beam group comprising of 4 beams, similar to LTE specification Class A rank 1 W1, which requires maximum 8 bits. So, the number of bits reported in the $2^{nd}$ reporting instance is 8 bits. In yet another example, $3^{rd}$ reporting instance is according to one of the following: for Codebook-Config=1, it indicates the index of the strongest beam (2 bits), index of the remaining 1 out of 3 beams (2 bits), and beam power of the remaining 1 beam (2 bits). So, the total is 6 bits; and for Codebook-Config=2, 3, or 4, it indicates 2 out of 4 beam selection (3 bits). In yet another example, $4^{th}$ reporting instance is the same as the $3^{rd}$ reporting instance in embodiment 0 for rank 1 and that in embodiment 4 for rank 2.

In some embodiments of 9, if a UE is configured the LC codebook with Codebook-Config=1 and L=4, then for periodic reporting of rank 1 or 2 CSI using PUCCH Format 2/2a/2b (PUCCU mode 1-1), the UE reports CSI in four reporting instances which are as follows. In one example, $1^{st}$ reporting instance is for RI reporting, which requires 3 bits. In another example, $2^{nd}$ reporting instance is for the $1^{st}$ PMI pair ($i_{1,1}$, $i_{1,2}$) reporting, which indicates a beam group comprising of 4 beams, similar to LTE specification Class A rank 1 W1, which requires maximum 8 bits. So, the number of bits reported in the $2^{nd}$ reporting instance is 8 bits. In yet another example, $3^{rd}$ reporting instance is indicates the index of the strongest beam (2 bits), and beam power of the remaining 3 beams (2 bits per beam). So, the total number of reported bits is 8. In yet another example, $4^{th}$ reporting instance is the same as the $3^{rd}$ reporting instance in embodiment 1 for rank 1 and that in embodiment 5 for rank 2.

Note that for Codebook-Config=2, 3, or 4, and L=4, there is no need of beam selection and beam power selection. Hence, periodic CSI reporting in four reporting instances may not be necessary unless the number of bits report coefficients ($i_2$ reporting) is reported in two different reporting instances. For instance, according to Alt 1 in FIG. 12, we can report 4 co-phase values and 3 coefficients in two different reporting instances. The following embodiment is an example of such CSI reporting.

In some embodiments of 10, if a UE is configured the LC codebook with Codebook-Config=2, 3, or 4, and L=4, then for periodic reporting of rank 1 or 2 CSI using PUCCH Format 2/2a/2b (PUCCU mode 1-1), the UE reports CSI in four reporting instances which are as follows. In one example, $1^{st}$ reporting instance is for RI reporting, which requires 3 bits. In another example, $2^{nd}$ reporting instance is for the 1st PMI pair ($i_{1,1}$, $i_{1,2}$) reporting, which indicates a beam group comprising of 4 beams, similar to LTE specification Class A rank 1 W1, which requires maximum 8 bits. So, the number of bits reported in the $2^{nd}$ reporting instance is 8 bits. In yet another example, $3^{rd}$ reporting instance is $i_{21}$ reporting which indicates four co-phase values selected from a QPSK alphabet. So, the total number of reported bits is 8. In yet another example, $4^{th}$ reporting instance is as follows: for rank 1, it is for $i_{22}$ reporting which indicates 3 coefficients selected from a QPSK alphabet. So, the total number of reported bits is 4 (for rank 1 CQI)+6=10 bits; for rank 2, it is for $i_{22}$ reporting which indicates 3 coefficients selected from a BPSK alphabet. So, the total number of reported bits is 7 (for rank 2 CQI)+3=10 bits.

In some embodiments, a UE is configured with an LC codebook in which: Codebook-Config=2, 3, and 4 is according to some embodiments of the present disclosure; and Codebook-Config=1 corresponds to unrestricted or free selection of L beams, where L=2, 3, from the full DFT basis which consists of $N_1N_2$ orthogonal beams. In such instances, the number of bits to select L=2 beams is 7 bits at the most which corresponds to $N_1 \times N_2 = 16$. In such instances, the number of bits to select L=3 beams is 10 bits at the most which corresponds to $N_1 \times N_2 = 16$.

Assuming effective oversampling (4, 4), the additional 2-bit per dimension (4 bits in total) is needed to select a full DFT basis for beam selection. So in total the number of bits to indicate W1 beams using the $1^{st}$ PMI pair ($i_{1,1}$,$i_{1,2}$) is 11 and 14 for L=2 and 3, respectively. So, for L=2, the $1^{st}$ PMI pair can be reported in the $2^{nd}$ reporting instance without any need for subsampling. For L=3, there may be two alternatives. In one alternative, for L=3, periodic CSI reporting is not supported. In one alternative, for L=3, periodic CSI reporting is supported after subsampling. Two examples of subsampling are as follows. In one example, the effective oversampling factor is further reduced to (2, 1) or (1, 2), where oversampling factor 2 is in longer dimension or shorter dimension. This results in 3 bit reduction in the number of bits. Hence, the number of bits for $1^{st}$ PMI pair reporting is down to 11 bits which may fit in PUCCH Format 2. In another example, it is considered that beam (0, 0) is always selected. Hence, the number of bits to select the remaining 2 beams is reduced to 7 bits. This together with 4 bits for (4,4) oversampling makes the total number of bits to 11 bits.

Also, for PUCCH based periodic reporting in this Codebook-Config=1, equal beam power combining is considered. So, beam power for the L beams does not need to be reported. In the $1^{st}$ reporting instance, RI is reported, and in the $3^{rd}$ reporting instance ($i_2$, CQI) is reported. In one example, for L=2, rank 1: ($i_2$, CQI) is reported without any subsampling assuming QPSK alphabet for coefficients (10 bits). In another example, for L=2, rank 2: ($i_2$, CQI) is reported with subsampling assuming BPSK alphabet for coefficients (10 bits). In yet another example, for L=3, rank 1: ($i_2$, CQI) is reported with subsampling assuming BPSK alphabet for coefficients (9 bits). In yet another example, for L=3, rank 2: ($i_2$, CQI) is reported with subsampling assuming BPSK alphabet for coefficients (2 bits) and a common co-phase for all beams (1 bit), so total is 10 bits In some embodiments, for Codebook-Config=2, 3, and 4, both periodic CSI reporting on PUCCH and aperiodic CSI reporting on PUSCH are supported, where periodic CSI reporting on PUCCH is according to some embodiments of the present disclosure. For Codebook-Config=1, however, only aperiodic CSI reporting on PUSCH is supported.

In some embodiments, for Codebook-Config=1, 2, 3, and 4, both periodic CSI reporting on PUCCH and aperiodic CSI reporting on PUSCH are supported, where periodic CSI reporting on PUCCH is according to some embodiments of the present disclosure.

In some embodiments, a UE is configured with an LC codebook W=W1W2 with L=2 beams for both rank 1 and rank 2, where W1 and W2 codebooks are used to report WB and SB components of the PMI, respectively. The codebook for rank 3-8 is the same as LTE specification Class A rank 3-8 codebooks. The Class A rank 3-8 codebook is referred as "advanced CSI Codebook." The W1 codebook comprises of the following components. In one example, uniformly spaced orthogonal beam groups of size ($L_1$, $L_2$) that are constructed as follows: for $N_1N_2 \leq 8$, orthogonal beam group correspond to the full $N_1 \times N_2$ orthogonal DFT basis, i.e. ($L_1$, $L_2$)=($N_1$, $N_2$); and for $N_1N_2 > 8$, a group of 8 uniformly spaced orthogonal beams are selected which corresponds to either ($L_1$, $L_2$)=(4, 2) if 2D antenna port layouts with $N_1 \geq N_2$ and $N_2 \neq 1$, ($L_1$, $L_2$)=(2, 4) if 2D antenna port layouts with $N_1 < N_2$ and $N_2 \neq 1$, or ($L_1$, $L_2$)=(8, 1) if 1D antenna port layouts with $N_2=1$. In another example, beam selection: L=2 beams are selected from $L_1L_2$ beams in the selected orthogonal beam group. The leading beam index ($k_1^{(0)}$, $k_2^{(0)}$) is given by: $k_1^{(0)}=0, 1, \ldots N_1O_1-1$; and $k_2^{(0)}=0, 1, \ldots N_2O_2-1$.

The leading beam corresponds to the strongest beam with beam power $p_0=1$. The second beam index ($k_1^{(1)}$, $k_2^{(1)}$) is given by: $k_1^{(1)}=k_1^{(0)}+O_1d_1$; and $k_2^{(1)}=k_2^{(0)}+O_2d_2$ where ($d_1$, $d_2$) satisfies the following: $d_1 \in \{0, 1, \ldots, \min(N_1, L_1)-1\}$; $d_2 \in \{0, 1, \ldots, \min(N_2, L_2)-1\}$; and ($d_1$, $d_2$)$\neq$(0,0) where ($L_1$, $L_2$) is defined above.

In yet another example, beam power: L=2 selected beams are associated with beam power level using a 2-bit beam power codebook. Note that the power level of the stronger beam (beam with larger power) can be assumed to be 1 without loss of generality. So, the power level of the $2^{nd}$ beam (beam with lower or equal power level than the $1^{st}$ beam) need to be selected from the beam power codebook.

Figure 17:
FIG. 17 illustrates orthogonal beams in the proposed codebook.
Figure 17:
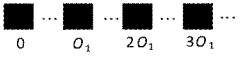
Figure 17:
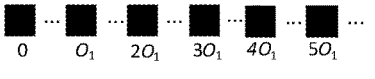
Figure 17:
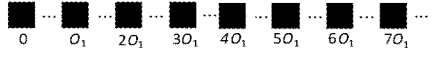
Figure 17:
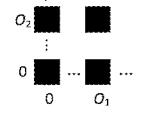
Figure 17:
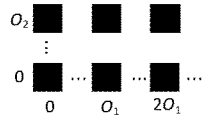
Figure 17:
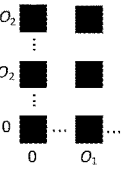
Figure 17:
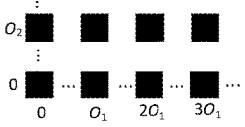
Figure 17:
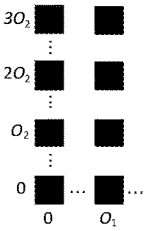

The beam power level for the two beams are given by: $p_O=1$, $p_1 \in \{1, \sqrt{0.5}, \sqrt{0.25}, 0\}$. The illustration of orthogonal beams in the proposed codebook is shown in FIG. 17.

The W2 codebook comprising of the following components: L=2 beams are combined using QPSK=$\{1, j, -1, -j\}$ phase codebook; and in case of rank 2, the phase to combine two beams are selected independently for the two layers.

Mathematically, the structure of the proposed LC codebook is given by:

$$W_1 = \begin{bmatrix} B & 0 \\ 0 & B \end{bmatrix}, B = \left[ p_0 b_{k_1^{(0)}, k_2^{(0)}}, p_1 b_{k_1^{(1)}, k_2^{(1)}} \right],$$

where for rank 1:

$$W = \begin{bmatrix} \tilde{w}_{0,0} \\ \tilde{w}_{1,1} \end{bmatrix} = W_1 W_2, \text{ and } W_2 = \begin{bmatrix} c_{0,0} \\ c_{1,0} \end{bmatrix},$$

for rank 2:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2, \text{ and}$$

$$W_2 = \begin{bmatrix} c_{0,0} & c_{0,1} \\ c_{1,0} & c_{1,1} \end{bmatrix}, c_{r,l} = [c_{r,l,0}, c_{r,l,1}]^T, r = 0, 1, l = 0, 1,$$

$$\tilde{w}_{r,l} = \sum_{i=0}^{1} b_{k_1^{(i)}, k_2^{(i)}} \cdot p_i \cdot c_{r,l,i}; r = 0, 1, l = 0, 1,$$

indices r, l, i are for two polarizations, layers, and beam, respectively, $a_1$ and $a_2$ are normalization factors for rank 1 and rank 2 pre-coders, respectively.

$b_{k_1, k_2}$ is a 2D DFT beam from the oversampled DFT beam grid, where $k_1 = 0, 1, \ldots N_1 O_1 - 1$, and $k_2 = 0, 1, \ldots N_2 O_2 - 1$.

$0 \le p_i \le 1$ beam power scaling factor for beam i $c_{r,l,i}$ beam combining coefficient for beam i and on polarization r and layer l.

The W1 and W2 payload sizes of the proposed codebook are summarized in TABLE 4 and 5, respectively.

TABLE 4

| | | | W1 payload for ($i_{1,1}$, $i_{1,2}$) reporting | | | |
|---|---|---|---|---|---|---|
| Port layouts | Number of ports | ($N_1$, $N_2$) | Number of bits to select leading beam ($k_1^{(0)}$, $k_2^{(0)}$), B0 | Number of bits to select $2^{nd}$ beam ($k_1^{(1)}$, $k_2^{(1)}$), B1 | Number of bits to select beam power for $2^{nd}$ beam, B2 | Total number of bits for ($i_{1,1}$, $i_{1,2}$) reporting B = B0 + B1 + B2 |
| 1D | 4 | (2, 1), (1, 2) | 3 | 0 | 2 | 5 |
|  | 8 | (4, 1), (1, 4) | 4 | 2 |  | 8 |
|  | 12 | (1, 6), (6, 1) | 5 | 3 |  | 10 |
|  | 16 | (1, 8), (8, 1) | 5 | 3 |  | 10 |
|  | 20 | (1, 10), (10, 1) | 6 | 3 |  | 11 |
|  | 24 | (1, 12), (12, 1) | 6 | 3 |  | 11 |
|  | 28 | (1, 14), (14, 1) | 6 | 3 |  | 11 |
|  | 32 | (1, 16), (16, 1) | 6 | 3 |  | 11 |
| 2D | 8 | (2, 2) | 6 | 2 |  | 10 |
|  | 12 | (2, 3), (3, 2) | 7 | 3 |  | 12 |
|  | 16 | (2, 4), (4, 2) | 7 | 3 |  | 12 |
|  | 20 | (2, 5), (5, 2) | 8 | 3 |  | 13 |
|  | 24 | (2, 6), (6, 2), (3, 4), (4, 3) | 8 | 3 |  | 13 |
|  | 28 | (2, 7), (7, 2) | 8 | 3 |  | 13 |
|  | 32 | (2, 8), (8, 2), (4, 4) | 8 | 3 |  | 13 |

TABLE 5

| | W2 payload for $i_2$ reporting |
|---|---|
| Rank | Number of bits for $i_2$ reporting |
| 1 | 6 |
| 2 | 12 |

In some embodiments, a UE is configured with advanced CSI codebook for rank 1-8 as follows: rank 1-2: advanced CSI codebook (explained above); and rank 3-8: legacy LTE codebooks (e.g., LTE specification). In such instance, for 4 ports, rank 3-4 codebook is configured with ($N_1$, $N_2$)=(2, 1); for 8 ports, 1D, rank 3-8 codebook is configured with ($N_1$, $N_2$)=(4, 1); for 8 ports, 2D, rank 3-8 codebook is configured according to LTE specification configuration method; and for (12, 16, 20, 24, 28, 32) ports, rank 3-8 Class A codebook is configured according to LTE specification configuration method.

In some embodiments, a UE is configured to report advanced CSI Codebook based periodic CSI using PUCCH Format 2/2a/2b in three CSI reporting instances (PUCCH mode 1-1), as shown in FIG. 14. Since the maximum number of CSI bits that can be reported using PUCCH Format 2 is 11 bits, codebook subsampling is applied if the number of CSI bits exceeds this limit. A few schemes to report periodic CSI is as follows.

In one embodiment of Scheme 0, the CSI reporting in three reporting instances are as follows. In one example of $1^{st}$ CSI reporting instance, RI is reported, which requires 3 bits. In another example of $2^{nd}$ CSI reporting instance, the W1 bits in the form of the $1^{st}$ PMI pair ($i_{1,1}$, $i_{1,2}$) is reported according to one of the following reporting alternatives. In one instance of Alt 0-0, equal beam power combining, i.e.

$p_1=1$ is used to report periodic CSI. So, 2 bits for the $2^{nd}$ beam power is not needed, and hence the number of bits to report $(i_{1,1}, i_{1,2})$ is reduced by 2 bits. In one instance of Alt 0-1, 1-bit beam power, i.e., $p_1 \in \{1, 0.5\}$ is used to report beam power for the weaker beam. This reduces the number of bits by 1 bit. In one instance of Alt 0-2, 1-bit beam power, i.e., $p_1 \in \{1, 0.5\}$ is used to report beam power for the weaker beam. This reduces the number of bits by 1. This together with one of the following sub-alternatives implies that the number of bits to report $(i_{1,1}, i_{1,2})$ can be reduced to 11 bits. In one instance of Alt 0-2-0, the subsampled W1 so that the effective oversampling factor is $(O_1, O_2)=(4,2)$. In other words, $k_1^{(0)}=0, 1, 2, \ldots N_1O_1-1$ and $k_2^{(0)}=0, 2, 4, \ldots N_2O_2-1$. In one instance of Alt 0-2-1, the subsampled W1 so that the effective oversampling factor is $(O_1, O_2)=(2,4)$. In other words, $k_1^{(0)}=0, 2, 4, \ldots N_1O_1-1$ and $k_2^{(0)}=0, 1, 2, \ldots N_2O_2-1$. In one instance of Alt 0-3, the subsampled W1 so that the effective oversampling factor is $(O_1, O_2)=(2,2), (4,2),$ or $(2,4)$. In one instance of Alt 0-3-0, the subsampled W1 so that the effective oversampling factor is $(O_1, O_2)=(4,2)$. In other words, $k_1^{(0)}=0, 1, 2, \ldots N_1O_1-1$ and $k_2^{(0)}=0, 2, 4, \ldots N_2O_2-1$. In one instance of Alt 0-3-1, the subsampled W1 so that the effective oversampling factor is $(O_1, O_2)=(2,4)$. In other words, $k_1^{(0)}=0, 2, 4, \ldots N_1O_1-1$ and $k_2^{(0)}=0, 1, 2, \ldots N_2O_2-1$. In one instance of Alt 0-3-2, the subsampled W1 so that the effective oversampling factor is $(O_1, O_2)=(2,2)$. In other words, $k_1^{(0)}=0, 2, 4, \ldots N_1O_1-1$ and $k_2^{(0)}=0, 2, 4, \ldots N_2O_2-1$.

Since the number of W1 bits to report $(i_{1,1}, i_{1,2})$ for different port layouts is different, above-mentioned subsampling alternatives, Alt 0-1 to Alt 0-3, may or may not be applied depending on whether the number of CSI bits to report $(i_{1,1}, i_{1,2})$ in $2^{nd}$ reporting instance at most 11 bits or more than 11 bits.

In some embodiments, one of Alt 0-1 to Alt 0-3 is applied regardless of the number of CSI bits to report $(i_{1,1}, i_{1,2})$. In some embodiments, one of Alt 0-1 to Alt 0-3 is applied only if the number of CSI bits to report $(i_{1,1}, i_{1,2})$ exceeds 11 bits. This corresponds to 2D port layouts for $\{12, 16, 20, 24, 28, 32\}$ ports. For example, for 2D port layouts for 12 and 16 ports, one of Alt 0-1, Alt 0-3-0, and Alt 0-3-1 can be used. And for 2D port layouts for $\{20, 24, 28, 32\}$ ports, one of Alt 0-0, Alt 0-2, and Alt 0-3-2 can be used. Note that in this method, no subsampling is needed for 1D port layouts and 2D port layouts for 8 ports. In some embodiments, one of Alt 0-1 to Alt 0-3 is applied to all 2D port layouts. In one example of $3^{rd}$ reporting instance, W2 bits in the form of the $2^{nd}$ PMI $i_2$ and CQI are reported. In some embodiments for rank 1, $(i_2, CQI)$ is reported without any subsampling assuming QPSK alphabet for coefficients, which requires (6 bits for $i_2$+4 bits for CQI) 10 bits to report rank 1 $(i_2, CQI)$. The rank-1 W2 pre-coder is given by $[1\ c_{0,0,1}\ c_{1,0,0}\ c_{1,0,1}]^T$, where $c_{0,0,1}, c_{1,0,0},$ and $c_{1,0,1}$ belong to QPSK alphabet $\{1, j, -1, -j\}$. In some embodiments for rank 2, $(i_2, CQI)$ is reported with subsampling assuming BPSK alphabet for coefficients. Since rank 2 CQI requires 7 bits, the remaining 4 bits is used to report rank 2 $i_2$ according to one of the following options. In one example of Option 0, 3 bits BPSK $\{1, -1\}$ alphabet is used to select three coefficients in layer 0 independently, and 1 bit BPSK alphabet $\{1, -1\}$ is used to select three coefficients in layer 1 dependently, which is common to the three coefficients. The rank-2 W2 pre-coder is given by $$\begin{bmatrix} 1 & c_{0,0,1} & c_{1,0,0} & c_{1,0,1} \\ 1 & a & a & a \end{bmatrix}^T,$$

where for Layer 0, $c_{0,0,1}, c_{1,0,0},$ and $c_{1,0,1}$ are independent and belong to BPSK alphabet $\{1, -1\}$ and for Layer 1, $c_{0,1,1}=c_{1,1,0}=c_{1,1,1}=a$ and belong to BPSK alphabet $\{1, -1\}$.

In another example of option 1, the rank-2 W2 pre-coder is given by $$\begin{bmatrix} 1 & a & c_{1,0,0} & b \\ 1 & a & c_{1,1,0} & b \end{bmatrix}^T,$$

where for beam 0, $c_{1,0,0}$ and $c_{1,1,0}$ for second polarization are independent and belong to BPSK alphabet $\{1, -1\}$, which requires 2 bits and for beam 1, $c_{0,0,1}=c_{0,1,1}=a$ and $c_{1,0,1}=c_{1,1,1}=b$ and belong to BPSK alphabet $\{1, -1\}$, which requires 2 bits. In yet another example of Option 2, the rank-2 W2 pre-coder is given by $$\begin{bmatrix} 1 & a & c_{1,0,0} & a \\ 1 & a & c_{1,1,0} & b \end{bmatrix}^T,$$

where for beam 0, $c_{1,0,0}$ and $c_{1,1,0}$ for second polarization are independent and belong to BPSK alphabet $\{1, -1\}$, which requires to 2 bits and for beam 1, $c_{0,0,1}=c_{1,0,1}=a$ and $c_{0,1,1}=c_{1,1,1}=b$ and belong to BPSK alphabet $\{1, -1\}$, which requires 2 bits. In yet another example of Option 3, the rank-2 W2 pre-coder is given by either $$\begin{bmatrix} 1 & a & b & c \\ 1 & a & -b & -c \end{bmatrix}^T \text{ or } \begin{bmatrix} 1 & a & b & c \\ 1 & -a & -b & c \end{bmatrix}^T,$$

where $a, b, c \in \{1, -1\}$, which requires 4 bits in total. In yet another example of option 4, the rank-2 W2 pre-coder is given by either $$\begin{bmatrix} 1 & a & b & c \\ 1 & da & -b & -dc \end{bmatrix}^T,$$

where $a, b, c, d \in \{1, -1\}$, which requires 4 bits in total. In yet another example of option 5, the rank-2 W2 pre-coder is given by either $$\begin{bmatrix} 1 & c_0 & \phi_0 & \phi_0 c_0 \\ 1 & c_1 & \phi_1 & \phi_1 c_1 \end{bmatrix}^T,$$

where $c_0, c_1, \phi_0, \phi_1 \in \{1, -1\}$, which requires 4 bits in total. In yet another example of option 6, the rank-2 W2 pre-coder is given by either $$\begin{bmatrix} 1 & c & \phi & c\phi \\ 1 & c & -\phi & -c\phi \end{bmatrix}^T,$$

where $c, \phi \in \{1, -1\}$, which requires 2 bits in total.

In some embodiments of scheme 1, the CSI reporting in three reporting instances are as follows. In one example of $1^{st}$ CSI reporting instance, there may be one of the following two alternatives. In one instance of joint reporting, (RI, $2^{nd}$ beam selection, beam power for the $2^{nd}$ beam) are reported jointly, which requires at most 6 bits. Note that there may be 28 states (7 beams and 4 beam power) for rank 1, 28 states for rank 2, and 6 states for rank 3-8, which in total amounts to 62 states. In one instance of separate reporting, RI and ($2^{nd}$ beam selection, beam power for the $2^{nd}$ beam) are reported separately. We therefore need 3 bits for RI reporting and 5 bits for ($2^{nd}$ beam selection, beam power for the $2^{nd}$ beam) reporting, which amounts to 8 bits CSI reporting in the $1^{st}$ CSI reporting instance. In another example of $2^{nd}$ CSI reporting instance: The $1^{st}$ PMI pair ($i_{1,1}, i_{1,2}$) indicating the leading beam similar to LTE specification Class A codebook, which requires 8 bits at the most. In yet another example of $3^{rd}$ CSI reporting instance is one of the alternatives (options) in Scheme 0.

In some embodiments of Scheme 2, the CSI reporting in three reporting instances are as follows. In one example of $1^{st}$ CSI reporting instance, there may be one of the following two alternatives. In one instance of joint reporting, RI and $2^{nd}$ beam selection are reported jointly, which requires at most 5 bits. Note that there may be 7 states for beam selection for rank 1, 7 states for beam selection for rank 2, and 6 states for rank 3-8, which in total amounts to 20 states. In one instance of separate reporting, RI and $2^{nd}$ beam selection are reported separately. We therefore need 3 bits for RI reporting and 3 bits for $2^{nd}$ beam selection reporting, which amounts to 6 bits CSI reporting in the $1^{st}$ CSI reporting instance. In one instance of $2^{nd}$ CSI reporting instance, the $1^{st}$ PMI pair ($i_{1,1}, i_{1,2}$) indicating the leading beam as in LTE specification Class A codebook, and beam power for the $2^{nd}$ beam, which requires at most 8+2=10 bits. In one instance, $3^{rd}$ CSI reporting instance is one of the alternatives (options) in Scheme 0.

In some embodiments of Scheme 3, the CSI reporting in three reporting instances are as follows. In one example of $1^{st}$ CSI reporting instance, there may be one of the following two alternatives. In one instance of joint reporting, RI and beam power for the $2^{nd}$ beam are reported jointly, which requires at most 4 bits. Note that there may be 4 states for rank 1, 4 states for rank 2, and 6 states for rank 3-8, which in total amounts to 14 states. In one instance of separate reporting, RI and beam power for the $2^{nd}$ beam are reported separately. We therefore need 3 bits for RI reporting and 2 bits for beam power for the $2^{nd}$ beam reporting, which amounts to 5 bits CSI reporting in the $1^{st}$ CSI reporting instance. In one instance of $2^{nd}$ CSI reporting, the $1^{st}$ PMI pair $i_{1,2}$ indicating the leading beam as in LTE specification Class A codebook, and $2^{nd}$ beam selection, which requires at most 8+3=11 bits. In one instance, $3^{rd}$ CSI reporting instance is one of the alternatives (options) in Scheme 0.

In some embodiments, a UE is configured to report advanced CSI Codebook based periodic CSI using PUCCH Format 3 in three CSI reporting instances (PUCCH mode 1-1), as shown in FIG. 14, as follows. In one example of $1^{st}$ CSI reporting instance in scheme 3, RI is reported. This requires 3 bits. In one example of $2^{nd}$ CSI reporting instance in scheme 3, the $1^{st}$ PMI pair ($i_{1,1}, i_{1,2}$) indicating index of the leading beam, index of the $2^{nd}$ beam, and power of the $2^{nd}$ beam is reported. This requires 13 bits at most. In one example of $3^{rd}$ CSI reporting instance in scheme 3, the $2^{nd}$ PMI $i_2$ and CQI are reported. This requires 10 bits for rank 1 and 19 bits for rank 2.

In some embodiments, a UE is configured to report advanced CSI Codebook based periodic CSI using PUCCH Format 3 in two CSI reporting instances (PUCCH mode 1-1) as follows. In one example of $1^{st}$ CSI reporting instance in scheme 4, RI and the $1^{st}$ PMI pair ($i_{1,1}, i_{1,2}$) indicating index of the leading beam, index of the $2^{nd}$ beam, and power of the $2^{nd}$ beam are reported. This requires 16 bits at most. In one example of $2^{nd}$ CSI reporting instance in scheme 4, the $2^{nd}$ PMI $i_2$ and CQI are reported. This requires 10 bits for rank 1 and 19 bits for rank 2.

In some embodiments of A, a UE is configured with PUCCH Format 2/2a/2b based periodic advanced CSI reporting in which codebook subsampling is applied if the number of CSI bits exceeds the limit of 11 bits to report CSI using PUCCH Format 2. In this case, advanced CSI is reported in three CSI reporting instances (similar to LTE specification 13 Class A based periodic CSI reporting). In one example of $1^{st}$ reporting instance, RI (3 bits). In one example of $2^{nd}$ reporting instance, subsampled ($i_{1,1}, i_{1,2}$) if the number of bits to report ($i_{1,1}, i_{1,2}$)>11; (details below). In one example of $3^{rd}$ reporting instance, subsampled $i_2$ if the number of bits to report ($i_2$, CQI)>11 (details below).

Since ($i_{1,1}, i_{1,2}$) payload for all 1D port layouts, i.e., $N_1$>1, $N_2$=1, and 8 ports, 2D port layout, i.e., ($N_1, N_2$)=(2, 2) is within 11 bits limit (Table 4), no subsampling is applied. For 2D port layouts for {12, 16, 20, 24, 28, 32} ports, the following subsampling is applied. In one embodiment of 2D port layouts for 12 and 16 ports, ($i_{1,1}, i_{1,2}$) payload is reduced by 1 bit. In such example, ($N_1, N_2$)=(3, 2) and (4, 2): subsample by reducing the number of leading (stronger) beam candidates so that the effective oversampling factor is ($O_1, O_2$)=(4, 2). In other words, the $1^{st}$ and $2^{nd}$ indices of the leading (stronger) beam are $k_1^{(0)}$=0, 2, 4, ... $N_1 O_1$−1 and $k_2^{(0)}$=0, 1, 2, ... $N_2 O_2$−1, respectively. In such example, ($N_1, N_2$)=(2, 3) and (2, 4); subsample by reducing the number of leading (stronger) beam candidates so that the effective oversampling factor is ($O_1, O_2$)=(2, 4). In other words, the $1^{st}$ and $2^{nd}$ indices of the leading (stronger) beam are $k_1^{(0)}$=0, 1, 2, ... $N_1 O_1$−1 and $k_2^{(0)}$=0, 2, 4, ... $N_2 O_2$−1. In one embodiments of 2D port layouts for {20, 24, 28, 32} ports, ($i_{1,1}, i_{1,2}$) payload is reduced by 2 bits. In such embodiment, subsample by reducing the number of leading (stronger) beam candidates so that the effective oversampling factor is ($O_1, O_2$)=(2, 2). In other words, the $1^{st}$ and $2^{nd}$ indices of the leading (stronger) beam are, $k_1^{(0)}$=0, 2, 4, ... $N_1 O_1$−1 and $k_2^{(0)}$=0, 2, 4, ... $N_2 O_2$−1.

For rank 1, ($i_2$, CQI) is reported without any subsampling, because it requires (6 bits for $i_2$+4 bits for CQI) 10 bits to report rank 1 ($i_2$, CQI) which is within the 11 bits limit. For rank 2, ($i_2$, CQI) is reported with subsampling considering BPSK alphabet for coefficients. Since rank 2 CQI requires 7 bits, there are 4 remaining bits to report rank 2 $i_2$, which is reported as follows: the subsampled rank-2 $W_2$ pre-coder is given by either $$\begin{bmatrix} 1 & a & b & c \\ 1 & a & -b & -c \end{bmatrix}^T \text{ or } \begin{bmatrix} 1 & a & b & c \\ 1 & -a & -b & c \end{bmatrix}^T,$$

where a, b, c∈{1, −1}, which requires 4 bits in total.

In some embodiments for rank 2, PUCCH based periodic reporting is according to one of the following sub-alternatives. In one example of sub-alternative 0 for rank 2 periodic advanced CSI reporting, legacy LTE (up to LTE specification) codebook, e.g. LTE specification 4Tx, LTE specification Tx, LTE specification {8, 12, 16, 20, 24, 28, 32} Class A codebook, based rank 2 periodic CSI reporting is supported. In another example of sub-alternative 1, the rank-2 W2 pre-coder is given by either $$\begin{bmatrix} 1 & a & b & c \\ 1 & a & -b & -c \end{bmatrix}^T \text{ or } \begin{bmatrix} 1 & a & b & c \\ 1 & -a & -b & c \end{bmatrix}^T,$$

where a, b, c∈{1, −1}, which requires 4 bits in total. In yet another example of sub-alternative 2, the rank-2 W2 pre-coder is given by $$\begin{bmatrix} 1 & a & b & c \\ 1 & da & -b & -dc \end{bmatrix}^T,$$

where a, b, c, d∈{1, −1}, which requires 4 bits in total. In yet another example of sub-alternative 3, the rank-2 W2 pre-coder is given by $$\begin{bmatrix} 1 & a & b & ab \\ 1 & ca & -b & -cab \end{bmatrix}^T,$$

where a∈{1, j, −1, −j} and b, c∈{1, −1}, which requires 4 bits in total. In yet another example of sub-alternative 4, the rank-2 W2 pre-coder is given by $$\begin{bmatrix} 1 & a & b & ab \\ 1 & ca & -b & -cab \end{bmatrix}^T,$$

where b∈{1, j, −1, −j} and a, c∈{1,−1}, which requires 4 bits in total. In yet another example of sub-alternative 5, the rank-2 W2 pre-coder is given by $$\begin{bmatrix} 1 & c_0 & \phi_0 & \phi_0 c_0 \\ 1 & c_1 & \phi_1 & \phi_1 c_1 \end{bmatrix}^T,$$

where $c_0, c_1, \phi_0, \phi_1 \in \{1, -1\}$, which requires 4 bits in total. In yet another example of sub-alternative 6, the rank-2 W2 pre-coder is given by $$\begin{bmatrix} 1 & c & \phi & c\phi \\ 1 & c & -\phi & -c\phi \end{bmatrix}^T,$$

where c, $\phi \in \{1, -1\}$ or $\{1, j, -1, -j\}$, which requires 2 or 4 bits in total.

In some embodiments of B, a UE is configured with either PUSCH mode 1-2, 2-2, 3-1, and 3-2 based aperiodic advanced CSI reporting; or PUCCH mode 1-1 based periodic advanced CSI reporting using PUCCH Format 2/2a/2b.

In one example for both aperiodic and periodic reporting, for RI=1 and 2, CQI/PMI is reported based on the advanced CSI codebook. In one example for both aperiodic and periodic reporting, for RI>2, CQI/PMI is reported based on legacy/Class A codebook as follows: 4 port: LTE specification 4 Tx rank 3-4 codebook; 8 port, 1D: LTE specification 8 Tx rank 3-8 codebook; 8 ports, 2D: LTE specification rank 3-8 codebook; and {12, 16, 20, 24, 28, 32} ports: LTE specification rank 3-8 Class A codebook.

For periodic reporting, the codebook subsampling is applied if the number of CSI bits exceeds the limit of 11 bits to report CSI using PUCCH Format 2. In this case, advanced CSI is reported in three CSI reporting instances (similar to LTE specification Class A based periodic CSI reporting). In one example of $1^{st}$ reporting instance, RI and relative beam power or scaling for the $2^{nd}$ beam that for example is indicated using RPI (relative beam indicator) since it is relative to the $1^{st}$ (stronger) beam whose power is fixed to 1. In such example, it requires 3 or 4 or 5 bits as explained earlier in some embodiments of the present disclosure. In another example of $2^{nd}$ reporting instance: ($i_{1,1}, i_{1,2}$). In such example, no subsampled is needed since maximum number of bits is 11 bits, which fits into PUCCH Format 2/2a/2b maximum payload. In yet another example of $3^{rd}$ reporting instance, subsampled $i_2$ if the number of bits to report ($i_2$, CQI)>11, for rank 1, $i_2$ payload is 6 bits (hence not subsampled) and for rank 2, $i_2$ payload is 2 or 4 bits with rank 2 precoder $$W_2 = \begin{bmatrix} 1 & 1 \\ c & c \\ \varphi & -\varphi \\ \varphi c & -\varphi c \end{bmatrix},$$

where c and φ are independent and one of BPSK {1, −1} or QPSK {1, j, −1, −j} variables or their subset such as {1, j}. Alternatively, $i_2$ payload is reduced to within 4 bits according to at least one of the sub-embodiments (0-6) in the previous embodiment (cf. embodiment A). In particular, it is according Sub-alternative 1 in which the rank-2 W2 pre-coder is given by either $$\begin{bmatrix} 1 & a & b & c \\ 1 & a & -b & -c \end{bmatrix}^T$$

with a∈{i, j, −1, −j}, b∈{1, j}, and c∈{1, −1}.

To report the CSI in the $1^{st}$ CSI reporting instance, RI and beam power or scaling for the $2^{nd}$ beam (or RPI) are reported as a new PUCCH reporting type 11 as shown in TABLE 6 (if Mode 2-1 is not supported, and for joint RI and beam power payload as explained in Scheme 3 above) and in TABLE 7A (if Mode 2-1 is supported, and for joint RI and beam power payload as explained in Scheme 3 above). TABLE 7B shows PUCCH mode 1-1 codebook subsampling with parameter advancedCodebookEnabled=TRUE, RI=2.

For separate RI and beam power payload, the same is shown in TABLE 8 (if Mode 2-1 is not supported) and TABLE 9 (if Mode 2-1 is supported). The PUCCH reporting payload size in $2^{nd}$ and $3^{rd}$ reporting instances are also shown in TABLE 6 and TABLE 8.

The states of joint RI and beam power payload (TABLE 6 and TABLE 7A) are as follow. In one example for 2, 4, 8 layer multiplexing, states 0-3 are for RI=1 and States 4-7 are for RI=2. In another example for 4 layer multiplexing, states 8-9 are for RI=3-4 and states 10-15 are reserved. In yet another example for 8 layer multiplexing, states 8-13 are for RI=3-8 and states 14-15 are reserved.

TABLE 6

PUCCH Reporting Type Payload size per PUCCH Reporting Mode and Mode State (Joint payload)

| PUCCH Reporting Type | Reported | Mode State | PUCCH Reporting Modes | | | |
|---|---|---|---|---|---|---|
| | | | Mode 1-1 bits/BP* | Mode 2-1 bits/BP* | Mode 1-0 bits/BP* | Mode 2-0 bits/BP* |
| 11 | RI/Beam power or RPI | 4/8/12/16/20/24/28/32 antenna ports, 2-layer spatial multiplexing | 3 | NA | NA | NA |
| | | 4/8/12/16/20/24/28/32 antenna ports, 4-layer spatial multiplexing | 4 | NA | NA | NA |
| | | 8/12/16/20/24/28/32 antenna ports, 8-layer spatial multiplexing | 4 | NA | NA | NA |
| 2a | Wideband first PMI | 4 antenna ports with advancedCodebookEnabled = True, 1 ≤ RI ≤ 2 | 3 | NA | NA | NA |
| | | 4 antenna ports with advancedCodebookEnabled = True, 3 ≤ RI ≤ 4 | 0 | NA | NA | NA |
| | | 8 antenna ports with advancedCodebookEnabled = True, 1 ≤ RI ≤ 2 | 6 | NA | NA | NA |
| | | 8 antenna ports with advancedCodebookEnabled = True, 3 ≤ RI ≤ 4 | 2 | NA | NA | NA |
| | | 8 antenna ports with advancedCodebookEnabled = True, 5 ≤ RI ≤ 8 | 0 | NA | NA | NA |
| | | 8/12/16/20/24/28/32 antenna ports with advancedCodebookEnabled = True and eMIMO-Type is set to 'CLASS A', 1 ≤ RI ≤ 8 | Note[1] | NA | NA | NA |
| 2b | Wideband CQI/ second PMI | 4/8 antenna ports with advancedCodebookEnabled = True or 8/12/16/20/24/28/32 antenna ports with advancedCodebookEnabled = True and eMIMO-Type is set to 'CLASS A', RI = 1 | 10 | NA | NA | NA |
| | | 4/8 antenna ports with advancedCodebookEnabled = True or 8/12/16/20/24/28/32 antenna ports with advancedCodebookEnabled = True and eMIMO-Type is set to 'CLASS A', RI = 2 | 11 | NA | NA | NA |

Note 1:
Sum of Wideband first PMI i1, 1 bit width, Wideband first PMI i1, 2 bit width, Wideband first PMI i1, 3 bit width in LTE specification (if the table has three first PMI) OR Sum of Wideband first PMI i1, 1-1 bit width, Wideband first PMI i1, 1-2 bit width, Wideband first PMI i1, 2-1 bit width and Wideband first PMI i1, 2-2 bit width in LTE specification (if the table has four first PMI)

TABLE 7A

PUCCH Reporting Type Payload size per PUCCH Reporting Mode and Mode State (Joint payload)

| PUCCH Reporting Type | Reported | Mode State | PUCCH Reporting Modes | | | |
|---|---|---|---|---|---|---|
| | | | Mode 1-1 bits/BP* | Mode 2-1 bits/BP* | Mode 1-0 bits/BP* | Mode 2-0 bits/BP* |
| 11 | RI/Beam power or RPI | 4/8/12/16/20/24/28/32 antenna ports, 2-layer spatial multiplexing | 3 | 3 | NA | NA |
| | | 4/8/12/16/20/24/28/32 antenna ports, 4-layer spatial multiplexing | 4 | 4 | NA | NA |

TABLE 7A-continued

PUCCH Reporting Type Payload size per PUCCH Reporting Mode and Mode State (Joint payload)

| PUCCH Reporting Type | Reported | Mode State | Mode 1-1 bits/BP* | Mode 2-1 bits/BP* | Mode 1-0 bits/BP* | Mode 2-0 bits/BP* |
|---|---|---|---|---|---|---|
| | | 8/12/16/20/24/28/32 antenna ports, 8-layer spatial multiplexing | 4 | 4 | NA | NA |

TABLE 7B

PUCCH mode 1-1 codebook subsampling with parameter advancedCodebookEnabled = TRUE, RI = 2
Relationship between the second PMI value and codebook index $i_2$

| Value of the second PMI $I_{PMI2}$ | Codebook Index $i_2$ |
|---|---|
| 0 | 2048 |
| 1 | 2113 |
| 2 | 2178 |
| 3 | 2243 |
| 4 | 2568 |
| 5 | 2633 |
| 6 | 2698 |
| 7 | 2763 |
| 8 | 3348 |
| 9 | 3413 |
| 10 | 3478 |
| 11 | 3543 |
| 12 | 3868 |
| 13 | 3933 |
| 14 | 3998 |
| 15 | 4063 |

TABLE 8

PUCCH Reporting Type Payload size per PUCCH Reporting Mode and Mode State (Separate payload)

| PUCCH Reporting Type | Reported | Mode State | Mode 1-1 bits/BP* | Mode 2-1 bits/BP* | Mode 1-0 bits/BP* | Mode 2-0 bits/BP* |
|---|---|---|---|---|---|---|
| 11 | RI/Beam power or RPI | 4/8/12/16/20/24/28/32 antenna ports, 2-layer spatial multiplexing | 3 | NA | NA | NA |
| | | 4/8/12/16/20/24/28/32 antenna ports, 4-layer spatial multiplexing | 4 | NA | NA | NA |
| | | 8/12/16/20/24/28/32 antenna ports, 8-layer spatial multiplexing | 5 | NA | NA | NA |
| 2a | Wideband first PMI | 4 antenna ports with advancedCodebookEnabled = True, 1 ≤ RI ≤ 2 | 3 | NA | NA | NA |
| | | 4 antenna ports with advancedCodebookEnabled = True, 3 ≤ RI ≤ 4 | 0 | NA | NA | NA |
| | | 8 antenna ports with advancedCodebookEnabled = True, 1 ≤ RI ≤ 2 | 6 | NA | NA | NA |
| | | 8 antenna ports with advancedCodebookEnabled = True, 3 ≤ RI ≤ 4 | 2 | NA | NA | NA |
| | | 8 antenna ports with advancedCodebookEnabled = True, 5 ≤ RI ≤ 8 | 0 | NA | NA | NA |
| | | 8/12/16/20/24/28/32 antenna ports with advancedCodebookEnabled = True and eMIMO-Type is set to 'CLASS A', 1 ≤ RI ≤ 8 | Note[1] | NA | NA | NA |

TABLE 8-continued

PUCCH Reporting Type Payload size per PUCCH Reporting Mode and Mode State (Separate payload)

| PUCCH Reporting Type | Reported | Mode State | Mode 1-1 bits/BP* | Mode 2-1 bits/BP* | Mode 1-0 bits/BP* | Mode 2-0 bits/BP* |
|---|---|---|---|---|---|---|
| 2b | Wideband CQI/ second PMI | 4/8 antenna ports with advancedCodebookEnabled = True or 8/12/16/20/24/28/32 antenna ports with advancedCodebookEnabled = True and eMIMO-Type is set to 'CLASS A', RI = 1 | 10 | NA | NA | NA |
|  |  | 4/8 antenna ports with advancedCodebookEnabled = True or 8/12/16/20/24/28/32 antenna ports with advancedCodebookEnabled = True and eMIMO-Type is set to 'CLASS A', RI = 2 | 11 | NA | NA | NA |

Note 1:
Sum of Wideband first PMI i1, 1 bit width, Wideband first PMI i1, 2 bit width, Wideband first PMI i1, 3 bit width in LTE specification (if the table has three first PMI) OR Sum of Wideband first PMI i1, 1-1 bit width, Wideband first PMI i1, 1-2 bit width, Wideband first PMI i1, 2-1 bit width and Wideband first PMI i1, 2-2 bit width in LTE specification (if the table has four first PMI)

TABLE 9

PUCCH Reporting Type Payload size per PUCCH Reporting Mode and Mode State (Separate payload)

| PUCCH Reporting Type | Reported | Mode State | Mode 1-1 bits/BP* | Mode 2-1 bits/BP* | Mode 1-0 bits/BP* | Mode 2-0 bits/BP* |
|---|---|---|---|---|---|---|
| 11 | RI/Beam power or RPI | 4/8/12/16/20/24/28/32 antenna ports, 2-layer spatial multiplexing | 3 | 3 | NA | NA |
|  |  | 4/8/12/16/20/24/28/32 antenna ports, 4-layer spatial multiplexing | 4 | 4 | NA | NA |
|  |  | 8/12/16/20/24/28/32 antenna ports, 8-layer spatial multiplexing | 5 | 5 | NA | NA |

For periodic reporting (i.e., PUCCH mode 1-1), the three reporting instances (subframes) are configured as follows. In one example, in the case where wideband CQUPMI reporting is configured, the reporting instances for wideband CQUPMI are subframes satisfying as following Equation 2 given by:

$$(10 \times nf + \lfloor n_s/2 \rfloor - N_{OFFSET,CQI}) \bmod (N_{pd}) = 0 \quad \text{Equation 2}$$

The reporting interval of wideband first PMI reporting is an integer multiple H' of period $N_{pd}$ (in subframes). The reporting instances for wideband first PMI are subframes satisfying as following Equation 3 given by:

$$(10 \times n + \lfloor n_s/2 \rfloor - N_{OFFSET,CQI}) \bmod (H' \cdot N_{pd}) = \quad \text{Equation 3}$$

The reporting interval of the RI and RPI reporting if UE is configured in transmission mode 9 or 10, and with higher layer parameter advancedCodebookEnabled=TRUE, is an integer multiple $M_{RI}$ of period $N_{pd}$ (in subframes). The reporting instances for RI and RPI are subframes satisfying as following Equation 4 given by:

$$(10 \times nf + \lfloor n_s/2 \rfloor - N_{OFFSET,CQI} - N_{OFFSET,RI}) \bmod (N_{pd} \cdot M_{RI}) = 0 \quad \text{Equation 4}$$

where the parameters in equation 1, 2, and 3 are defined in LTE specification.

In some embodiment of C, a UE is configured with a CSI reporting which is the same as in embodiment B except that for periodic CSI reporting, for RI=1, CQUPMI is reported based on the advanced CSI codebook; and for RI>1, CQUPMI is reported based on legacy/Class A codebook as follows: for 4 port, LTE specification 4 Tx rank 3-4 codebook; for 8 port, 1D, LTE specification 8 Tx rank 3-8 codebook; for 8 ports and 2D, LTE specification rank 3-8 codebook; and for {12, 16, 20, 24, 28, 32} ports, LTE specification rank 3-8 Class A codebook. Note that according to this embodiment, no subsampling is needed to report rank 1 CSI based on the advanced CSI codebook.

For joint RI and beam power payload, RI and beam power or scaling for the $2^{nd}$ beam are reported as a new PUCCH reporting type 5a or 11 as shown in TABLE 10 (if Mode 2-1 is not supported) and in TABLE 11 (if Mode 2-1 is supported).

The states of joint RI and beam power payload (e.g., TABLE 10 and TABLE 11) are as follow: for 2, 4, 8 layer multiplexing, states 0-3 are for RI=1; for 2 layer multiplexing, states 4 is for RI=2 and states 5-7 are reserved; for 4 layer multiplexing, states 4-6 are for RI=2-4 and states 7 is reserved; and for 8 layer multiplexing, states 4-10 are for RI=2-8 and states 11-15 are reserved.

TABLE 10

PUCCH Reporting Type Payload size per PUCCH Reporting Mode and Mode State (Joint payload)

| PUCCH Reporting Type | Reported | Mode State | PUCCH Reporting Modes | | | |
|---|---|---|---|---|---|---|
| | | | Mode 1-1 bits/BP* | Mode 2-1 bits/BP* | Mode 1-0 bits/BP* | Mode 2-0 bits/BP* |
| 11 | RI/Beam power | 4/8/12/16/20/24/28/32 antenna ports, 2-layer spatial multiplexing | 3 | NA | NA | NA |
| | | 4/8/12/16/20/24/28/32 antenna ports, 4-layer spatial multiplexing | 3 | NA | NA | NA |
| | | 8/12/16/20/24/28/32 antenna ports, 8-layer spatial multiplexing | 4 | NA | NA | NA |

TABLE 11

PUCCH Reporting Type Payload size per PUCCH Reporting Mode and Mode State (Joint payload)

| PUCCH Reporting Type | Reported | Mode State | PUCCH Reporting Modes | | | |
|---|---|---|---|---|---|---|
| | | | Mode 1-1 bits/BP* | Mode 2-1 bits/BP* | Mode 1-0 bits/BP* | Mode 2-0 bits/BP* |
| 11 | RI/Beam power | 4/8/12/16/20/24/28/32 antenna ports, 2-layer spatial multiplexing | 3 | 3 | NA | NA |
| | | 4/8/12/16/20/24/28/32 antenna ports, 4-layer spatial multiplexing | 3 | 3 | NA | NA |
| | | 8/12/16/20/24/28/32 antenna ports, 8-layer spatial multiplexing | 4 | 4 | NA | NA |

Figure 16:
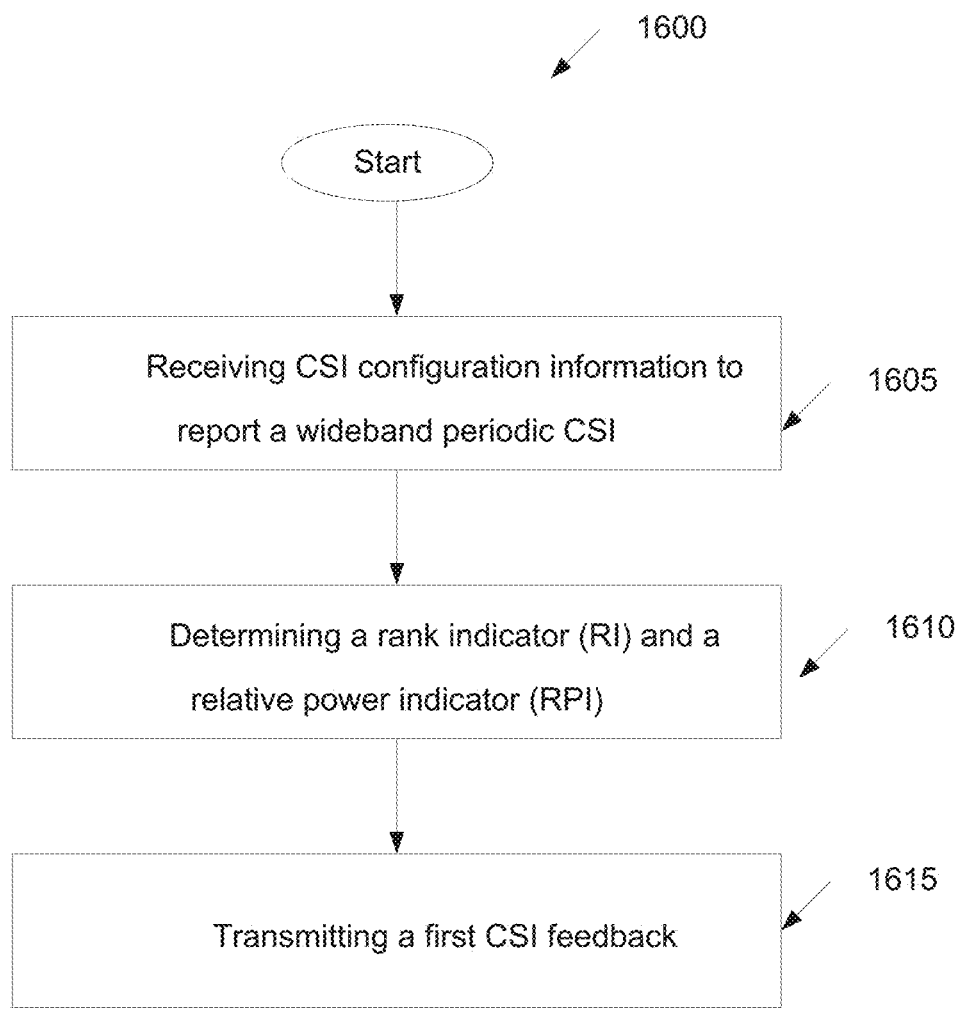
FIG. 16 illustrates a flow chart of a method for a CSI reporting according to embodiments of the present disclosure.

FIG. 16 illustrates a flow chart of a method 1600 for according to embodiments of the present disclosure, as may be performed by a UE (111-116 as shown in FIG. 1). An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, the method 1600 begins at step 1605. In step 1605, the UE receives, from a base station (BS), CSI configuration information to report a wideband periodic CSI including a pre-coding matrix indicator (PMI), a rank indicator (RI) and a relative power indicator (RPI) based on a linear combination (LC) codebook, wherein the PMI comprises a first PMI ($i_1$) indicating a plurality of beams and a second PMI ($i_2$) indicating a plurality of weights for linear combination of the plurality of beams. In some embodiments of step 1605, either the plurality of beams comprises a first discrete Fourier transform (DFT) vector and a second DFT vector for each layer of a precoding matrix corresponding to RI=1 or 2 and the RPI comprises a power assigned to the second DFT vector relative to a unit power assigned to the first DFT vector. In some embodiments of step 1605, the plurality of beams comprises a single DFT vector for each layer of the precoding matrix corresponding to RI>2 and the RPI is not reported in the first CSI feedback.

Subsequently, in step 1610, the UE determines, based on the CSI configuration information, the RI and RPI indicating a power of weights assigned to the plurality of beams. In some embodiments, the UE in step 1610 determines, based on the CSI configuration information, an indicator ($i_{1,1}$, $i_{1,2}$) included in the first PMI ($i_1$) to indicate the plurality of beams. In some embodiments, the UE in step 1610 determines a threshold value for a number of CSI bits based on the uplink channel to report the wideband periodic CSI and performs subsampling operation for a codebook for a third CSI feedback when the number of CSI bits exceeds the threshold value. In some embodiments, the UE in step 1610 determines, based on the CSI configuration information and the subsampled codebook, the second PMI ($i_2$) indicating a phase of the plurality of weights for the linear combination of the plurality of beams.

In such embodiments, the threshold value is determined based on a physical uplink control channel (PUCCH) Format 2/2a/2b that carries the third CSI feedback. In such embodiments, the number of CSI bits for the wideband periodic CSI comprises a number of CSI bits for the second PMI ($i_2$) and a number of CSI bits for a channel quality indicator (CQI), and wherein the third CSI feedback includes the second PMI ($i_2$) and the CQI. In such embodiments, the codebook subsampling operation is performed for the third CSI feedback only when the RI is set to 2 is lastly reported in the first CSI feedback, and the codebook subsampling operation is not performed when the reported RI value is not equal to 2.

Finally, in step 1615, the UE transmits, to the BS, over an uplink channel, a first CSI feedback comprising the RI and RPI in a first periodic reporting instance out of a plurality of periodic reporting instances. In some embodiments, the UE in step 1615 transmits, to the BS, over an uplink channel, a second CSI feedback comprising the indicator ($i_{1,1}$, $i_{1,2}$) in a second periodic reporting instance out of the plurality of periodic reporting instances. In some embodiments, the UE in step 1615 transmits, to the BS, over an uplink channel, the third CSI feedback including the second PMI ($i_2$) in a third periodic reporting instance out of a plurality of periodic reporting instances.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in an advanced communication system, the UE comprising:
    a transceiver configured to receive, from a base station (BS), CSI configuration information to report a wideband periodic CSI including a pre-coding matrix indicator (PMI), a rank indicator (RI) and a relative power indicator (RPI) based on a codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams; and
    at least one processor configured to determine, based on the CSI configuration information, the RI and the RPI, wherein the transceiver is further configured to transmit, to the BS over an uplink channel, a first CSI feedback comprising the RI and the RPI in a first periodic reporting instance out of a plurality of periodic reporting instances.

2. The UE of claim 1, wherein either the plurality of beams comprises a first discrete Fourier transform (DFT) vector and a second DFT vector for each layer of a precoding matrix corresponding to RI=1 or 2, and the RPI comprises a power assigned to the second DFT vector relative to a unit power assigned to the first DFT vector; or
    the plurality of beams comprises a single DFT vector for each layer of the precoding matrix corresponding to RI>2 and the RPI is not reported in the first CSI feedback.

3. The UE of claim 2, wherein:
    the at least one processor is further configured to determine, based on the CSI configuration information, an indicator ($i_{1,1}$, $i_{1,2}$) included in the first PMI ($i_1$) to indicate the plurality of beams; and
    the transceiver is further configured to transmit, to the BS over an uplink channel, a second CSI feedback comprising the indicator ($i_{1,1}$, $i_{1,2}$) in a second periodic reporting instance out of the plurality of periodic reporting instances.

4. The UE of claim 1, wherein:
    the at least one processor is further configured to:
        determine a threshold value for a number of CSI bits based on the uplink channel to report the wideband periodic CSI;
        perform subsampling operation for a codebook for a third CSI feedback when the number of CSI bits exceeds the threshold value; and
        determine, based on the CSI configuration information and the subsampled codebook, the second PMI ($i_2$) indicating a phase of the plurality of weights for the linear combination of the plurality of beams, and
    the transceiver is further configured to transmit, to the BS over an uplink channel, the third CSI feedback including the second PMI ($i_2$) in a third periodic reporting instance out of a plurality of periodic reporting instances.

5. The UE of claim 4, wherein the threshold value is determined based on a physical uplink control channel (PUCCH) Format 2/2a/2b that carries the third CSI feedback.

6. The UE of claim 4, wherein the number of CSI bits for the wideband periodic CSI comprises a number of CSI bits for the second PMI ($i_2$) and a number of CSI bits for a channel quality indicator (CQI), and wherein the third CSI feedback includes the second PMI ($i_2$) and the CQI.

7. The UE of claim 4, wherein the codebook subsampling operation is performed for the third CSI feedback only when the RI that is set to 2 is lastly reported in the first CSI feedback, and the codebook subsampling operation is not performed when a value of the transmitted RI is not equal to 2.

8. A base station (BS) for a channel state information (CSI) feedback in an advanced communication system, the BS comprising:
    a processor; and
    a transceiver operably connected to the processor, the transceiver configured to:
        transmit, to a user equipment (UE) over a downlink channel, CSI configuration information to receive a wideband periodic CSI including a pre-coding matrix indicator (PMI), a rank indicator (RI) and a relative power indicator (RPI) based on a codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams; and
        receive, from the UE, over an uplink channel, a first CSI feedback comprising the RI and RPI in a first periodic reporting instance out of a plurality of periodic reporting instances.

9. The BS of claim 8, wherein either the plurality of beams comprises a first discrete Fourier transform (DFT) vector and a second DFT vector for each layer of a precoding matrix corresponding to RI=1 or 2 and the RPI comprises a power assigned to the second DFT vector relative to a unit power assigned to the first DFT vector, or the plurality of beams comprises a single DFT vector for each layer of the precoding matrix corresponding to RI>2 and the RPI is not reported in the first CSI feedback.

10. The BS of claim 9, wherein the transceiver is further configured to receive, from the UE, over an uplink channel, a second CSI feedback comprising an indicator ($i_{1,1}$, $i_{1,2}$) in a second periodic reporting instance out of a plurality of periodic reporting instances, and wherein the indicator ($i_{1,1}$, $i_{1,2}$) included in the first PMI ($i_1$) to indicate the plurality of beams is determined based on the CSI configuration information.

11. The BS of claim 8, wherein:
the transceiver is further configured to receive, from the UE, over an uplink channel, a third CSI feedback including the second PMI ($i_2$) in a third periodic reporting instance out of a plurality of periodic reporting instances,
subsampling operation is performed for a codebook for the third CSI feedback when a number of CSI bits exceed a threshold value;
the threshold value is determined for the number of CSI bits based on the uplink channel to report the wideband periodic CSI; and
the second PMI ($i_2$) indicating a phase of the plurality of weights for the linear combination of the plurality of beams is determined based on the CSI configuration information and the subsampled codebook.

12. The BS of claim 8, wherein a threshold value is determined based on a physical uplink control channel (PUCCH) Format 2/2a/2b that carries a third CSI feedback, and wherein a codebook subsampling operation is performed for the third CSI feedback only when the RI that is set to 2 is lastly reported in the first CSI feedback, and the codebook subsampling operation is not performed when a value of the received RI is not equal to 2.

13. The BS of claim 12, wherein a number of CSI bits for the wideband periodic CSI comprises a number of CSI bits for the second PMI ($i_2$) and a number of CSI bits for a channel quality indicator (CQI), and wherein the third CSI feedback includes the second PMI ($i_2$) and the CQI.

14. A method of a user equipment (UE) for a channel state information (CSI) feedback in an advanced communication system, the method comprising:
receiving, from a base station (BS), CSI configuration information to report a wideband periodic CSI including a pre-coding matrix indicator (PMI), a rank indicator (RI) and a relative power indicator (RPI) based on a codebook, wherein the PMI comprises a first PMI ($i_1$) indicating a plurality of beams and a second PMI ($i_2$) indicating a plurality of weights for linear combination of the plurality of beams, and the RPI indicates a power of weights assigned to the plurality of beams;
determining, based on the CSI configuration information, the RI and RPI; and
transmitting, to the BS, over an uplink channel, a first CSI feedback comprising the RI and RPI in a first periodic reporting instance out of a plurality of periodic reporting instances.

15. The method of claim 14, wherein either the plurality of beams comprises a first discrete Fourier transform (DFT) vector and a second DFT vector for each layer of a precoding matrix corresponding to RI=1 or 2 and the RPI comprises a power assigned to the second DFT vector relative to a unit power assigned to the first DFT vector, or
the plurality of beams comprises a single DFT vector for each layer of the precoding matrix corresponding to RI>2 and the RPI is not reported in the first CSI feedback.

16. The method of claim 15, further comprising:
determining, based on the CSI configuration information, an indicator ($i_{1,1}$, $i_{1,2}$) included in the first PMI ($i_1$) to indicate the plurality of beams; and
transmitting, to the BS, over an uplink channel, a second CSI feedback comprising the indicator ($i_{1,1}$, $i_{1,2}$) in a second periodic reporting instance out of the plurality of periodic reporting instances.

17. The method of claim 14, further comprising:
determining a threshold value for a number of CSI bits based on the uplink channel to report the wideband periodic CSI;
performing subsampling operation for a codebook for a third CSI feedback when the number of CSI bits exceeds the threshold value;
determining, based on the CSI configuration information and the subsampled codebook, the second PMI ($i_2$) indicating a phase of the plurality of weights for the linear combination of the plurality of beams; and
transmitting, to the BS, over an uplink channel, the third CSI feedback including the second PMI ($i_2$) in a third periodic reporting instance out of a plurality of periodic reporting instances.

18. The method of claim 17, wherein the threshold value is determined based on a physical uplink control channel (PUCCH) Format 2/2a/2b that carries the third CSI feedback.

19. The method of claim 17, wherein the number of CSI bits for the wideband periodic CSI comprises a number of CSI bits for the second PMI ($i_2$) and a number of CSI bits for a channel quality indicator (CQI), and wherein the third CSI feedback includes the second PMI ($i_2$) and the CQI.

20. The method of claim 17, wherein the codebook subsampling operation is performed for the third CSI feedback only when the RI is set to 2 is lastly reported in the first CSI feedback, and the codebook subsampling operation is not performed when a value of the transmitted RI is not equal to 2.

* * * * *